(12) United States Patent
Kelfkens et al.

(10) Patent No.: US 10,696,913 B2
(45) Date of Patent: Jun. 30, 2020

(54) GASIFICATION REACTOR WITH PIPE DISTRIBUTOR

(71) Applicant: Aries Gasification, LLC, Franklin, TN (US)

(72) Inventors: Renus Kelfkens, Longmont, CO (US); Brandon Davis, Murfreesboro, TN (US); Paul Cairney, Deltona, FL (US); Gerald M. Cox, Cocoa, FL (US); William P. Jepson, Orlando, FL (US); Douglas R. Bull, Vancouver (CA); Ross Patten, Palm Coast, FL (US)

(73) Assignee: Aries Gasification, LLC, Franklin, TN (US)

(*) Notice: Subject to any disclaimer, the term of this patent is extended or adjusted under 35 U.S.C. 154(b) by 0 days.

(21) Appl. No.: 16/723,538

(22) Filed: Dec. 20, 2019

(65) Prior Publication Data

US 2020/0140768 A1    May 7, 2020

Related U.S. Application Data

(60) Continuation-in-part of application No. 16/445,118, filed on Jun. 18, 2019, now abandoned, which is a (Continued)

(51) Int. Cl.
*C10J 3/46* (2006.01)
*C10J 3/84* (2006.01)
(Continued)

(52) U.S. Cl.
CPC ............. *C10J 3/466* (2013.01); *B01J 8/1809* (2013.01); *B01J 8/1827* (2013.01); *C02F 11/10* (2013.01);
(Continued)

(58) Field of Classification Search
CPC .... B01J 2208/00893; B01J 2208/00902; B01J 8/1827; C10J 2300/0956; C10J 3/482;
(Continued)

(56) References Cited

U.S. PATENT DOCUMENTS 2,948,671 A * 8/1960 Packie .................. B01J 8/1827
208/134
3,981,690 A * 9/1976 Chen ........................ B01J 8/003
48/73
(Continued)

*Primary Examiner* — Imran Akram
(74) *Attorney, Agent, or Firm* — 21st Century IP LLC; Kelly Hollowell

(57) ABSTRACT

A large-scale fluidized bed biogasifier provided for gasifying biosolids. The biogasifier includes a reactor vessel with a pipe distributor and at least two fuel feed inlets for feeding biosolids into the reactor vessel at a desired fuel feed rate of more than 40 tons per day with an average of about 100 tons per day during steady-state operation of the biogasifier. A fluidized bed in the base of the reactor vessel has a cross-sectional area that is proportional to at least the targeted fuel feed rate such that the superficial velocity of gas is in the range of 0.1 m/s (0.33 ft/s) to 3 m/s (9.84 ft/s). In operation, biosolids are heated inside the fluidized bed reactor to a temperature range between 900° F. (482.2° C.) and 1600° F. (871.1° C.).

14 Claims, 12 Drawing Sheets

Related U.S. Application Data continuation-in-part of application No. 15/725,637, filed on Oct. 5, 2017, now abandoned, which is a continuation-in-part of application No. 14/967,973, filed on Dec. 14, 2015, now Pat. No. 9,809,769, which is a division of application No. 13/361,582, filed on Jan. 30, 2012, now Pat. No. 9,242,219.

(51) Int. Cl.

| | | |
|---|---|---|
| *B01J 7/00* | (2006.01) | |
| *B01J 8/18* | (2006.01) | |
| *C02F 11/10* | (2006.01) | |
| *C10K 1/02* | (2006.01) | |
| *C10J 3/48* | (2006.01) | |
| *C02F 11/121* | (2019.01) | |
| *C02F 11/12* | (2019.01) | |

(52) U.S. Cl.
CPC ............. *C10J 3/482* (2013.01); *C10J 3/84* (2013.01); *C10K 1/026* (2013.01); *B01J 2208/00893* (2013.01); *B01J 2208/00902* (2013.01); *C02F 11/12* (2013.01); *C02F 11/121* (2013.01); *C10J 2300/0909* (2013.01); *C10J 2300/0916* (2013.01); *C10J 2300/0923* (2013.01); *C10J 2300/0956* (2013.01); *C10J 2300/1643* (2013.01); *C10J 2300/1807* (2013.01); *Y02P 20/129* (2015.11); *Y02W 10/40* (2015.05); *Y10T 29/49* (2015.01)

(58) Field of Classification Search
CPC ....... C10J 3/54; C10J 3/56; C10J 3/523; C10J 2300/0959; C10J 3/503; C10J 2200/09
See application file for complete search history.

(56) References Cited

U.S. PATENT DOCUMENTS

| | | | | |
|---|---|---|---|---|
| 4,226,830 | A * | 10/1980 | Davis | B01J 8/1818 110/245 |
| 4,592,762 | A * | 6/1986 | Babu | C10J 3/482 252/373 |
| 4,608,059 | A * | 8/1986 | Kupfer | C10J 3/42 48/197 R |
| 4,710,202 | A * | 12/1987 | Gohler | C10J 3/485 48/73 |
| 4,725,288 | A * | 2/1988 | Bougard | F26B 17/12 48/76 |
| 4,968,325 | A * | 11/1990 | Black | C10J 3/482 422/143 |
| 5,080,780 | A * | 1/1992 | Canzoneri | B01D 17/0205 210/104 |
| 6,120,567 | A | 9/2000 | Cordell et al. | |
| 6,669,822 | B1 * | 12/2003 | Fujimura | C10B 53/02 201/37 |
| 7,322,301 | B2 | 1/2008 | Childs | |
| 7,793,601 | B2 | 9/2010 | Davidson et al. | |
| 2002/0112403 | A1 * | 8/2002 | Pope | C10J 3/482 48/127.3 |
| 2007/0245934 | A1 * | 10/2007 | Carman | C10J 3/26 110/229 |
| 2009/0158658 | A1 * | 6/2009 | Stadler | C10J 3/30 48/77 |
| 2009/0297417 | A1 * | 12/2009 | Sun | B01B 1/005 423/239.1 |
| 2011/0232191 | A1 * | 9/2011 | Diebold | B01D 29/27 48/87 |

* cited by examiner

GASIFICATION REACTOR WITH PIPE DISTRIBUTOR

This application is a Continuation-in-part of pending U.S. application Ser. No. 16/445,118, filed Jun. 18, 2019, which is a Continuing Application of application Ser. No. 15/725,637 filed Oct. 5, 2017; which is a Continuation-in-part of U.S. application Ser. No. 14/967,973 filed Dec. 14, 2015 now U.S. Pat. No. 9,809,769 issued Nov. 7, 2017; which is a Divisional Application of U.S. application Ser. No. 13/361,582 filed Jan. 30, 2012 now U.S. Pat. No. 9,242,219 issued Jan. 26, 2016.

FIELD

The present invention relates in general to the field of sewage sludge treatment, and in particular to a fluidized bed biogasification system and method for use in treatment of biosolids from sewage sludge.

BACKGROUND

U.S. Pat. No. 7,793,601 to Davison et al. entitled "Side Feed/Centre Ash Dump System" describes a gasifier for gasifying solid fuel, including solid organic materials. The gasifier includes a primary oxidation chamber having an inner surface lined with a refractory material. An inlet opening in one of the sides is provided for infeed of the solid fuel into the primary oxidation chamber. A storage container stores the solid fuel, and a transfer means connects the storage container with the inlet opening for transferring in an upwardly inclined direction the solid fuel from the storage container through the inlet opening into the primary oxidation chamber to form an upwardly mounted fuel bed of the solid fuel including the organic materials on the bottom of the primary oxidation chamber. The transfer means includes a hydraulic ram feeder and a compression tube, the hydraulic ram feeder driving fuel from the storage container into the compression tube, thereby compacting the fuel. Means are provided for supplying an oxidant into the primary oxidation chamber to gasify the solid organic materials to produce a gaseous effluent, thereby leaving a residue of solid fuel. Means are provided for removing the gaseous effluent from the primary oxidation chamber. An opening in the bottom of the primary oxidation chamber has mounted thereunder a means for the removal of the residue, including a walking-floor feeder.

U.S. Pat. No. 7,322,301 to Childs describes a method for processing wet sewage sludge or other feedstock including carbonaceous material principally composed of wet organic materials in a gasifier to produce useful products. The sludge or feedstock is first dewatered using thermal energy in a location separate from the gasifier. The feedstock is processed with a small amount of oxygen or air present at a temperature required to break down the feedstock and generate producer gas and char in the gasifier. Some of the fuel produced during the feedstock processing step is fed back to the separate location and burned to provide the thermal energy required in the feedstock dewatering step and thereby minimize or eliminate the need for external energy to dry the wet feedstock.

U.S. Pat. No. 6,120,567 to Cordell et al. describes a method for gasifying solid organic materials to produce a gaseous effluent and solid residue. A primary oxidation chamber having a converging upper portion and a bottom portion are provided. Solid organic materials are introduced into the primary oxidation chamber upwardly from the bottom portion of the primary oxidation chamber to provide a mass of solid organic materials in the primary oxidation chamber. The mass of solid organic materials is heated in the primary oxidation chamber. An oxidant is added to the primary oxidation chamber to gasify the heated mass of solid organic materials in the primary oxidation chamber and to initiate a flow of gaseous effluent within the primary oxidation chamber. A gaseous effluent flow path is established within the primary oxidation chamber, whereby a portion of the gaseous effluent repeatedly flows in a recirculating upward and downward direction through the heated solid organic materials to enhance continuous oxidation of the solid organic materials. A further portion of the gaseous effluent flow is advanced in a direction outward from the primary oxidation chamber. The solid residue is then transferred out of the primary oxidation chamber.

SUMMARY

A small and large-scale fluidized bed biogasifier is provided for gasifying biosolids; wherein the large-scale biogasifier includes a reactor vessel with a pipe distributor and at least two fuel feed inlets for feeding biosolids into the reactor vessel at a desired fuel feed rate of more than 40 tons per day with an average fuel feed rate of about 100 tons per day during steady-state operation of the biogasifier. The fluidized bed in the base of the reactor vessel has a cross-sectional area that is proportional to at least the fuel feed rate such that the superficial velocity of gas is in the range of 0.1 m/s (0.33 ft/s) to 3 m/s (9.84 ft/s). In operation, biosolids are fed into a fluidized bed reactor and oxidant gases are applied to the fluidized bed reactor to produce a superficial velocity of producer gas in the range of 0.1 m/s (0.33 ft/s) to 3 m/s (9.84 ft/s). The biosolids are heated inside the fluidized bed reactor to a temperature range between 900° F. (482.2° C.) and 1600° F. (871.1° C.) in an oxygen-starved environment having a sub-stoichiometric oxygen level, whereby the biosolids are gasified. In an embodiment, the internal diameter of the reactor is configured to ensure that the fluidized bed is able to be fluidized adequately for the desired fuel feed rate and the flow rate of the fluidizing gas mixture at different operating temperature, yet prevent slugging fluidization as media is projected up the freeboard section. Other factors may be used in the design and sizing of the biogasifier, including internal diameter of the bed section, internal diameter of a freeboard section, height of the freeboard section, bed depth and the bed section height to reach the targeted fuel feed rate.

In an embodiment, a method for gasifying biosolids is provided. Biosolids are fed into a fluidized bed reactor. Fluidizing gas consisting of air, flue gas, pure oxygen or steam, or a combination thereof, is introduced into the fluidized bed reactor to create a velocity range inside the freeboard section of the gasifier that is in the range of 0.1 m/s (0.33 ft/s) to 3 m/s (9.84 ft/s). The biosolids are heated inside the fluidized bed reactor to a temperature range between 900° F. (482.2° C.) and 1700° F. (926.7° C.) in an oxygen-starved environment having sub-stoichiometric levels of oxygen, e.g., typically oxygen levels of less than 45% of stoichiometric.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings.

Figure 1A:
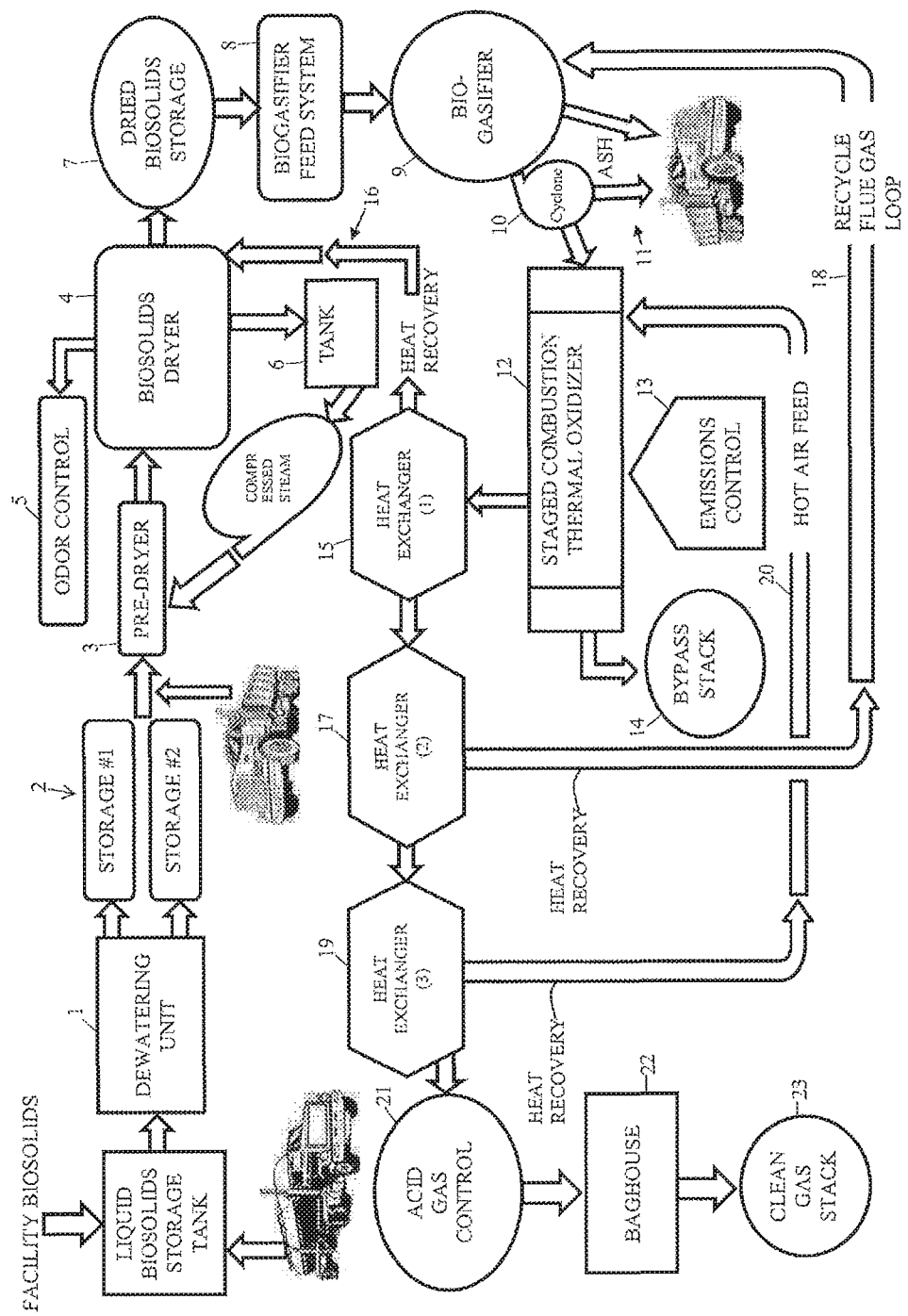
FIGS. 1A and 1B show schematic block diagrams illustrating alternate embodiments of the flow of an overall treatment process for biosolids.

With reference to FIG. 1A, an overall process for treatment of biosolids is shown. The process begins with a dewatering unit 1 for removing water content from the wet sewage sludge. Dewatering may be achieved in the dewatering unit 1 utilizing integrated technology including, e.g., a belt filter press, plate-and-frame press, and/or centrifuge. Specific volumes and blending of polymer are used in accordance with the specific application to help flocculate the materials and gain the most efficient dewatered percentage prior to the next step in the overall process.

The material can then be fed into storage 1 and storage 2, which may be sized such that appropriately staged volumes of dewatered cake are maintained within the pipeline to ensure a continuous process in the dryer. The storage may be controlled through load cells or level sensors, and the moisture of the biosolids may be constantly measured enroute to the pre-drying I dryer operation to ensure optimum control and performance output.

A pre-dryer unit 3 then takes the condensate, and steam typically at 215° F. to 240° F., from the biosolids dryer and uses it to pre-heat the biosolids prior to entry into the dryer. This pre-dryer feed loop 6 minimizes the amount of energy subsequently required by the dryer and demand on the biogasifier to the thermal fluid loop.

The biosolids are then fed to a biosolids dryer 4, which may consist of a continuous feed, screw type biosolids dryer.

The biosolids dryer may utilize thermal energy produced from the coupled gasification-combustion system as its primary source of energy for use in the drying process. The flue gas may then be passed through the heat exchanger. The energy from the heated flue gas can be conveyed through a gas-to-liquid heat exchanger into the thermal heating fluid. This thermal fluid may be recirculated through the chambers of the dryer "indirectly" conveying energy to the biosolids and thereby drying the product. The flue gas temperature into the heat exchanger may be controlled through the use of induction and dilution fans in order to maintain a consistent heat source for the drying system.

An odor control section 5 utilizes multiple types of odor control technology to extract all pollutants that may become airborne and potentially harmful outside of the process.

Dried biosolids storage 7 can be provided between the biosolids dryer 4 and the biogasifier feed system 8. The dried biosolids storage 7 may be sized to ensure that appropriately staged volumes of fuel can be maintained. This ensures a continuous process in the biogasifier. The storage 7 may be controlled through load cells or level sensors to ensure optimum control and performance output.

The biogasifier feed system 8 can be configured to meter the delivery of biosolids fuel into the biogasifier. In an embodiment, the feed system 8 includes two metering screws and a high-speed injection screw into the biogasifier bed for this purpose.

The biogasifier feed system 8 feeds a biogasifier unit 9. In an embodiment, the biogasifier unit 9 is of the bubbling fluidized bed type with a custom fluidizing gas delivery system and multiple instrument control. The biogasifier unit 9 provides the ability to continuously operate, discharge ash and recycle flue gas for optimum operation. The biogasifier unit 9 can be designed to provide optimum control of temperature, reaction rate and conversion of the biosolids fuel into producer gas.

The control mechanism for temperature within the biogasifier may be based on the system's ability to adjust the oxygen content relative to the fuel feed rate, thus adjusting reaction temperatures. In an embodiment, the biogasifier operates within a temperature range of 900-1700° F. during steady state operation. In another embodiment, the biogasifier operates within a temperature range of 1150-1600° F. during steady state operation, and this range is significantly preferred since it has been determined that below 1150° F. there will be limited reactions occurring and above 1600° F. there will be very pronounced agglomeration problems with biosolids. Oxygen is a reactant that facilitates the chemical reactions necessary for sustaining the gasification process.

A cyclone separator 10 can be provided to separate material exhausted from the fluidized bed reactor to create clean producer gas and ash for disposal. In an embodiment, the cyclone separator 10 is efficient to ensure over 95% particulate removal and gas clean up.

Ash discharge 11 from both the biogasifier 9 and the cyclone separator 10 are safe to transport. Such ash discharge may be disposed of, or may provide value in commercial applications, such as from the recovery and use of phosphorous.

A staged-combustion thermal oxidizer 12 may be provided for thermal oxidation of clean producer gas from the cyclone separator 10. This process may be used to generate heat that is used as energy in the system to operate, e.g., the biosolids dryer 4 in part or in full. The thermal oxidizer may be a refractory lined steel unit with ports for the introduction of air to promote the homogenous blending of the producer gas with air, taking the resultant mass to combustion. The producer gases are delivered from the biogasifier 9, to the thermal oxidizer 12 where they are reacted in a multi-stage process under negative pressure. In each stage, the temperature and oxygen content are tightly controlled, resulting in conversion of the producer gas to a very clean, low NOx, high-grade flue gas stream that may be recovered and used, as noted above, for the generation of heat as an energy input back into the system, or may be output from the system for other commercial uses.

Emissions controls 13 are provided for controlling emissions from the staged combustion thermal oxidizer 12. The emissions controls 13 may include an injection/misting point in which emission control chemicals are inserted after the combustion stage to reduce the NOx levels within the exiting air stream. Emission control chemicals may be either one or a combination of aqueous ammonia and urea.

A bypass stack 14 may be utilized for exhausting hot flue gas and/or thermal energy in the case of an emergency upset within the system, as controlled via a Supervisory Control And Data Acquisition (SCADA) system.

Dependent upon the end use of the energy, the media into which the thermal energy is conveyed may be thermal oil, hot air, hot water, steam, or the like. This process is achieved through the use of high efficiency heat exchangers that transfer thermal energy from the hot flue gas into another media. This converted media can be used to provide the energy to the selected recovery system. The gasification-combustion process followed by energy recovery utilizes energy in biosolids and reduces or eliminates the need for use of fossil fuels to dry the biosolids. This makes the disclosed gasification system an energy-efficient and environmentally friendly solution to biosolids management.

A first heat exchanger 15 receives heated flue gas from the staged combustion thermal oxidizer 12. The first heat exchanger 15 may be a gas-to-liquid type heat exchanger. Energy from the heated flue gas may be conveyed through the first heat exchanger 15 into a thermal heating fluid. This thermal fluid may be recirculated through the chambers of the dryer, indirectly conveying thermal energy to the biosolids and thereby drying the product. A thermal fluid loop 16 from the first heat exchanger 15 to the biosolids dryer 4 allows the energy recovery system to utilize heated flue gas from the thermal oxidizer as its primary source of energy.

A second heat exchanger 17 utilizes additional energy recovery streams (typically wasted) and returns the energy to the process for optimum performance efficiency. The second heat exchanger 17 in this embodiment is dedicated to a recycle flue gas loop 18. The source of the oxygen for the disclosed gasification system may be designed to come from air or flue gas, or mixtures thereof. In an embodiment, the disclosed system is configured such that oxygen may be introduced via re-circulated flue gas, which has an oxygen content of approximately 50% of ambient air. Having both ambient air and flue gas available as an oxygen source provides a level of flexibility for oxygen delivery that can be further used to control the biogasifier 9 temperature more precisely.

The infusion of flue gas into the fluidizing air stream provides some of the gas velocity required to transport particles out of the biogasifier 9 and into the cyclone, especially during low fuel feed rate operation conditions.

A third heat exchanger 19 may be provided to take additional energy streams, which are typically wasted in other processes, and re-insert them into the process for greater performance efficiency. In an embodiment, heat exchanger 19 is dedicated to the hot air feed 20 into the thermal oxidizer. The hot air feed 20, which comprises oxidizer air provides heating of the air being injected (via staged combustion air rings) into the oxidizer which assists in the overall efficiency and combustion ability through the process.

An emissions control device 21 may be used to remove acid gases from the flue gas stream, such as $SO_2$ and HCl, resultant from the combustion cycle. This emissions control device may be in the form of a dry injection system or a dry spray absorption system. In an embodiment, these systems may consists of multiple sections or devices: a device to blend the dry sorbent media with liquid in order to develop a sorbent slurry or a device to directly incorporate dry sorbent, a device to meter and inject said sorbent slurry or dry sorbent into the flue gas stream, a device to control the flow rate of the flue gas stream enabling efficient absorption of acid gases into the sorbent, a collection vessel for removal of precipitated dried reacted products (acid gases and sorbent slurry), or a secondary system (bag house) to capture absorbed dry reacted product or residuals that remain within the flue gas stream (downstream of the dry spray absorber or dry injection system).

A bag house 22 may be provided for filtering remaining particulate from the flue gas and may comprise a pulse-jet type bag house. Flue gases entering the bag house are cleaned by filtering the particulate through the bags in the bag house. A high-pressure blast of air is used to remove dust from the bag. Due to its rapid release, the blast of air does not interfere with contaminated flue gas flow. Therefore, the pulse-jet bag house can operate continuously with high effectiveness in cleaning the exiting flue gas.

A clean flue gas stack 23 provides the normal exit point from the process and one of many emission testing points that may be utilized to maintain constant regulatory compliance.

A SCADA system can be utilized to ensure full process control to all aspects of the biogasification system. As such, typical thermocouples, pressure instruments, level switches, gas analysis, moisture metering, flow meters and process instrumentation are used to provide 'real time' feedback, and automated adjustment of actuators to ensure optimum and efficient operation.

Figure 1B:
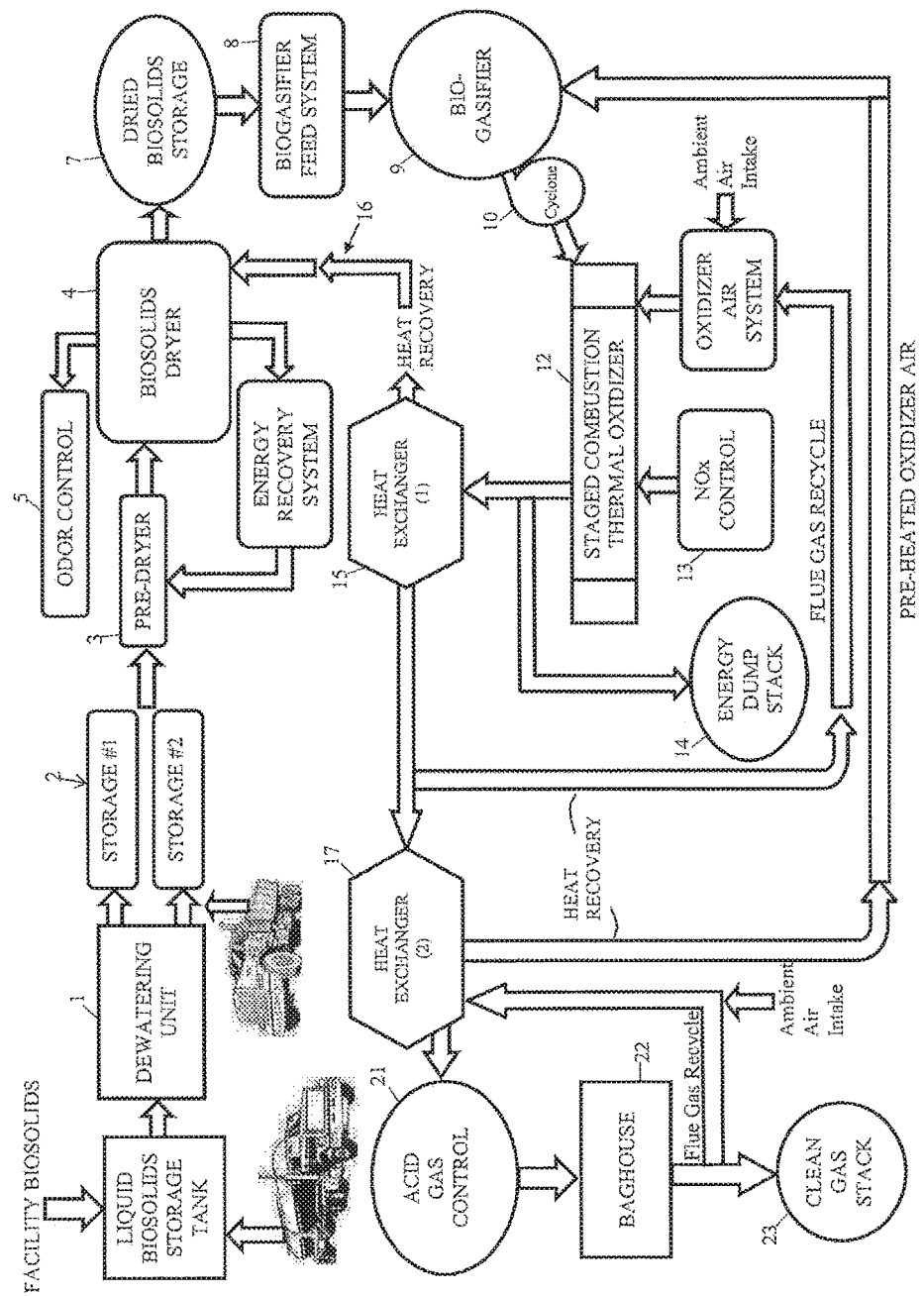

FIG. 1B shows an alternate embodiment of the overall flow diagram of FIG. 1A. In this embodiment, two heat exchangers are utilized rather than three as in the embodiment of FIG. 1A. In accordance with this embodiment, the second heat exchanger 17 can be utilized for additional energy recovery streams (typically wasted) and return the energy to the process for optimum performance efficiency. The second heat exchanger 17 may be used as a biogasifier oxidant air and gas pre-heater. The source of the oxygen for the disclosed gasification system may be designed to come from air or flue gas, or mixtures thereof. In an embodiment, the disclosed system may be configured such that the biogasifier oxidant air and gas, independently or in a mixed configuration, may be pre-heated as a means of energy recovery to further optimize the gasification system performance efficiency.

Figure 2:
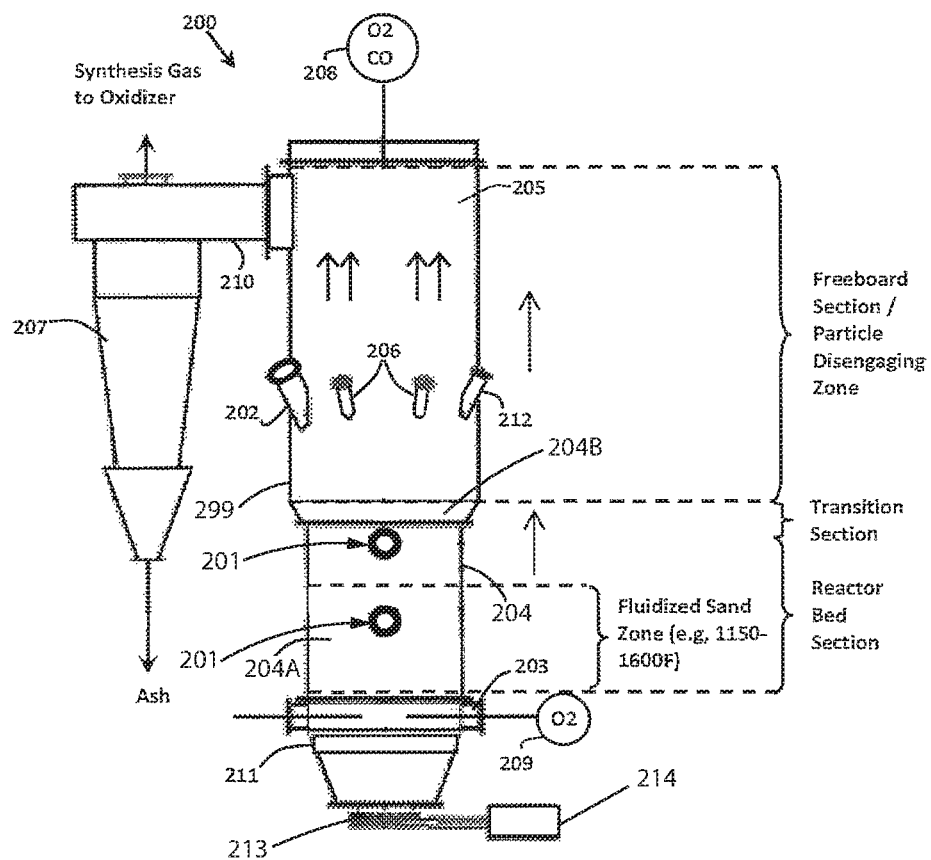
FIG. 2 shows a schematic side view illustrating a fluidized bed biogasifier in accordance with an embodiment of the invention.

FIG. 2 shows an embodiment of a bubbling type fluidized bed gasifier 200. In one embodiment, the bubbling fluidized bed gasifier 200 will include a reactor 299 operably connected to a feeder system (not shown) as an extended part of a standard gasifier system 200. In one embodiment, the gasifier 200 includes a reactor vessel 299. A fluidized media bed 204A such as but not limited to quartz sand is in the base of the reactor vessel called the reactor bed section 204. In one embodiment the fluidized sand is a zone that has a temperature of 1150-1600° F. Located above the reactor bed section 204 is a transition section 204B and above the transition section 204B is the freeboard section 205 of the reactor vessel 299. Fluidizing gas consisting of air, flue gas, pure oxygen or steam, or a combination thereof, is introduced into the fluidized bed reactor 299 to create a velocity range inside the freeboard section 205 of the gasifier 200 that is in the range of 0.1 m/s (0.33 ft/s) to 3 m/s (9.84 ft/s). The biosolids are heated inside the fluidized bed reactor to a temperature range between 900° F. and 1700° F. in an oxygen-starved environment having sub-stoichiometric levels of oxygen, e.g., typically oxygen levels of less than 45% of stoichiometric.

The reactor fluidized bed section 204 of a fluidized bubbling bed gasifier 200 is filled with a fluidizing media 204A that may be a sand (e.g., quartz or olivine), or any other suitable fluidizing media known in the industry. Feedstock such, as but not limited to sludge, is supplied to the reactor bed section 204 through fuel feed inlets 201 at 40-250° F. In one embodiment the feedstock is supplied to the reactor bed section 204 through fuel feed inlets 201 at 215° F.; with the gas inlet 203 in the bubbling bed receiving an oxidant-based fluidization gas such as but not limited to e.g., air. In one embodiment the air is at about 600° F. The air could be enriched air, or mix of air and recycle flue gas, etc. The type and temperature of the air is determined by the gasification fluidization and temperature control requirements for a particular feedstock. The fluidization gas is fed to the bubbling bed via a gas distributor, such as shown in FIGS. 3 and 8A-C. An oxygen-monitor 209 may be provided in communication with the fluidization gas inlet 203 to monitor oxygen concentration in connection with controlling oxygen levels in the gasification process. An inclined or over-fire natural gas burner (not visible) located on the side of the reactor vessel 299 receives a natural gas and air mixture via a port 202. In one embodiment, the natural gas air mixture is 77° F. which can be sued to start up the gasifier and heat the fluidized bed media 204A. When the minimum ignition temperature for self-sustaining of the gasification reactions is reached (~900° F.), the natural gas is shut off. View ports 206 and a media fill port 212 are also provided.

In one embodiment, a freeboard section 205 is provided between the fluidized bed section 204 and the producer gas outlet 210 of the gasifier reactor vessel 299. As the biosolids thermally decompose and transform in the fluidized bed media section (or sand zone) into producer gas and then rise through the reactor vessel 299, the fluidizing medium 204A in the fluidized bed section 204 is disentrained from the producer gas in the freeboard section 205 which is also known as and called a particle disengaging zone. A cyclone separator 207 may be provided to separate material exhausted from the fluidized bed reactor 299 resulting in clean producer gas for recovery with ash exiting the bottom of the cyclone separator 207 alternatively for use or disposal.

An ash grate 211 may be fitted below the gasifier vessel for bottom ash removal. The ash grate 211 may be used as a sifting device to remove any large inert, agglomerated or heavy particles so that the fluidizing media and unreacted char can be reintroduced into the gasifier for continued utilization. In one embodiment, a valve such as but not limited to slide valve 213 which is operated by a mechanism to open the slide valve 214 is located beneath the ash grate 211 to collect the ash. In one embodiment, a second valve 213 and operating mechanism 214 (no shown) are also located below the cyclone separator 207 for the same purpose. That is as a sifting device to remove any large inert, agglomerated or heavy particles so that the fluidizing media and unreacted char can be reintroduced into the gasifier for continued utilization. In one embodiment the ash grate 211 may be a generic solids removal device known to those of ordinary skill in the art. In another embodiment, the ash grate 211 may be replaced by or combined with the use of an overflow nozzle.

A producer gas control 208 monitors oxygen and carbon monoxide levels in the producer gas and controls the process accordingly. In one embodiment a gasifier feed system (not shown) feeds the gasifier reactor 299 through the fluidized fuel inlets 201. In one embodiment, the gasifier unit 200 is of the bubbling fluidized bed type with a custom fluidizing gas delivery system and multiple instrument control. The gasifier reactor 299 provides the ability to continuously operate, discharge ash and recycle flue gas for optimum operation. The gasifier reactor 299 can be designed to provide optimum control of feed rate, temperature, reaction rate and conversion of varying feedstock into producer gas.

A number of thermocouple probes (not shown) are placed in the gasifier reactor 299 to monitor the temperature profile throughout the gasifier. Some of the thermal probes are placed in the fluidized bed section 204 of the gasifier rector 299, while others are placed in the freeboard section 205 of the gasifier. The thermal probes placed in the fluidized bed section 204 are used not only to monitor the bed temperature but are also control points that are coupled to the gasifier air system via port 202 in order to maintain a certain temperature profile in the bed of fluidizing media. There are also a number of additional control instruments and sensors that may be placed in the gasifier system 200 to monitor the pressure differential across the bed section 204 and the operating pressure of the gasifier in the freeboard section 205. These additional instruments are used to monitor the conditions within the gasifier as well to as control other ancillary equipment and processes to maintain the desired operating conditions within the gasifier. Examples of such ancillary equipment and processes include but are not limited to the cyclone, thermal oxidizer and recirculating flue gas system and air delivery systems. These control instruments and sensors are well known in the industry and therefore not illustrated.

Figure 3:
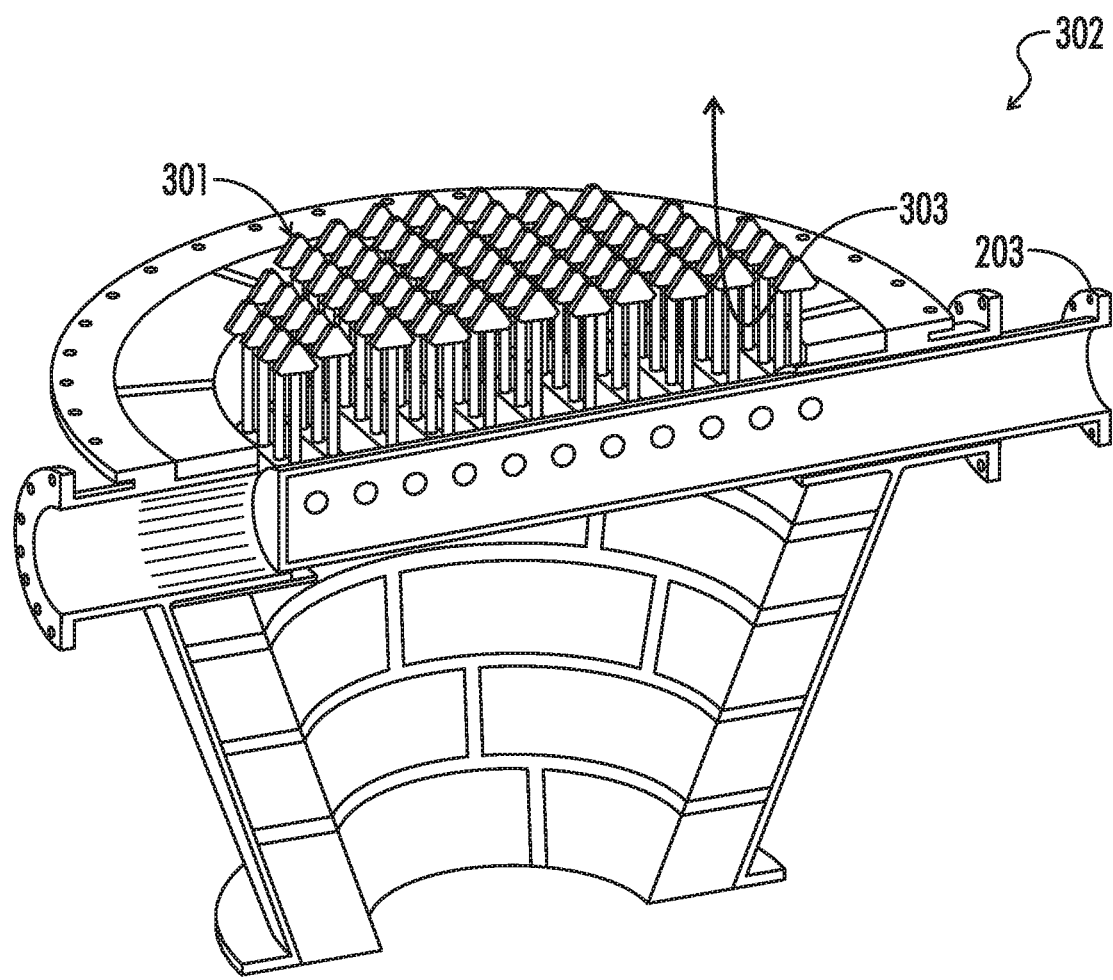
FIG. 3 shows a perspective view illustrating a tuyere type gas distributor of the biogasifier in accordance with an embodiment of the invention.
Figure 4A:
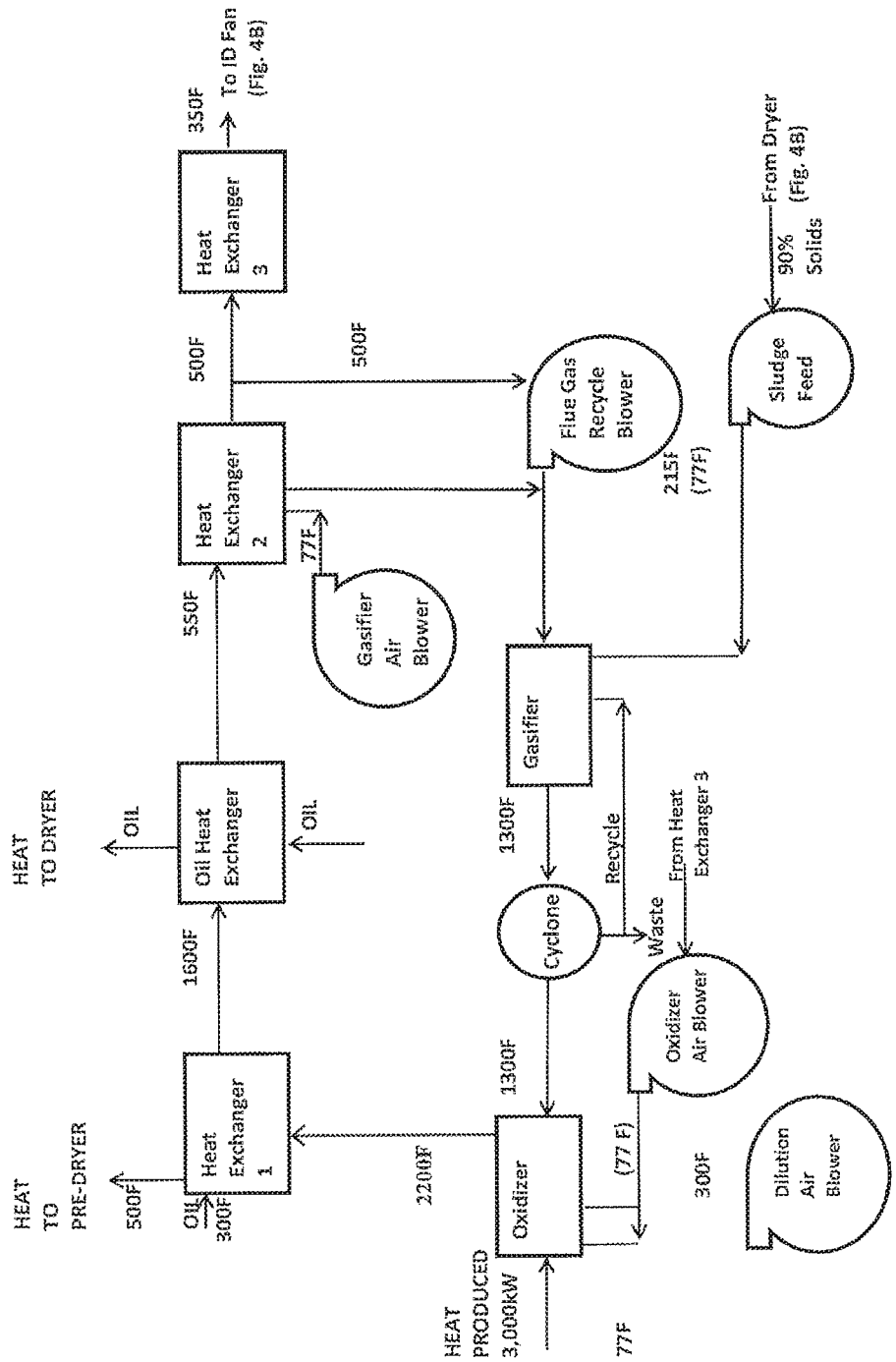
FIGS. 4A-4B show a schematic block diagram illustrating part of a gasification process in accordance with the invention in an embodiment.
Figure 4B:
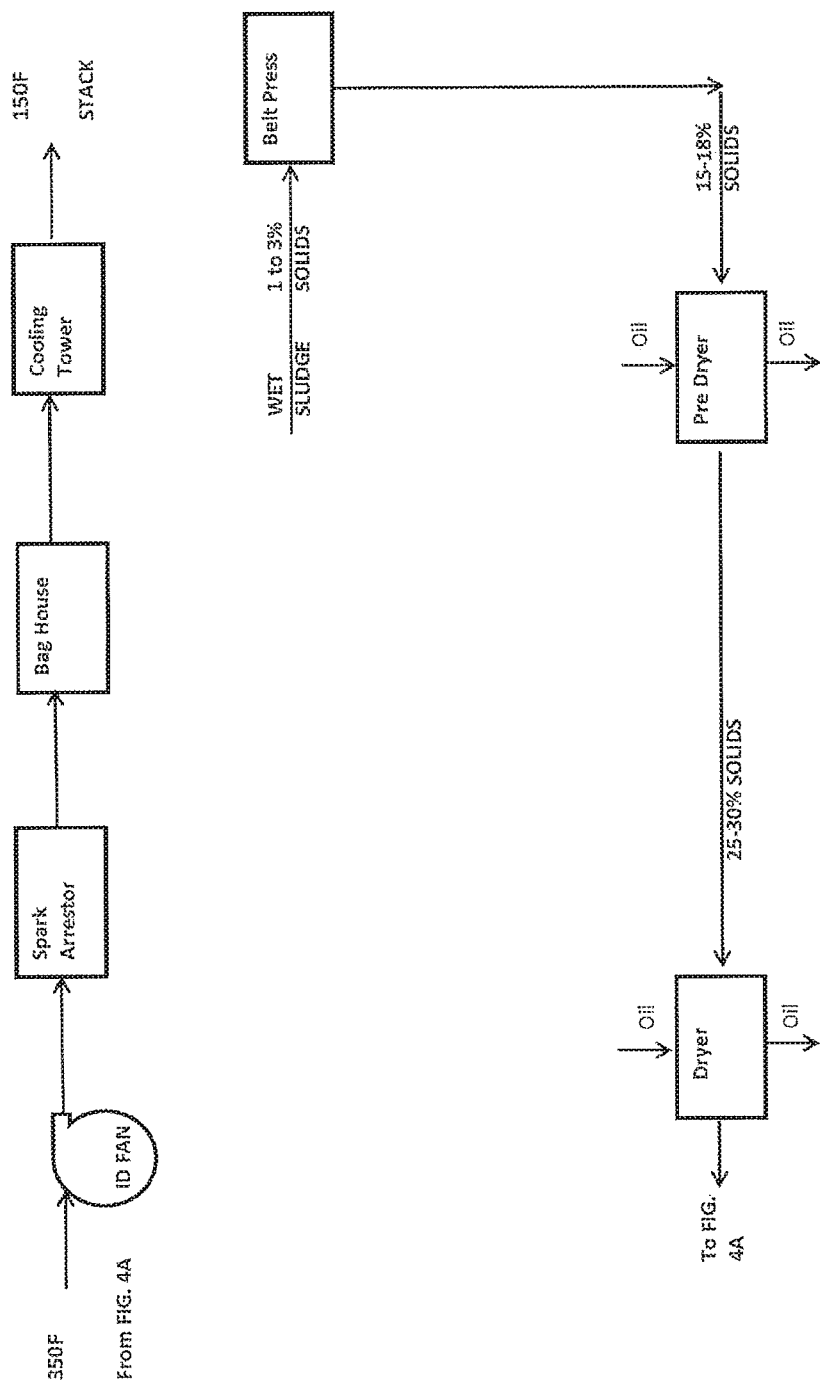

FIG. 3 shows a perspective cut away side view illustrating a gas distributor 302 of the biogasifier in accordance with an embodiment of the invention. A flue gas and air inlet 203 feeds flue gas and air to an array of nozzles 301. Each of the nozzles includes downwardly directed ports inside cap 303 such that gas exiting the nozzle is initially directed downward before being forced upward into the fluidized bed in the reactor bed section 204 (FIG. 2). An optional ash grate 211 under the gasifier may be used as a 'sifting' device to remove any agglomerated particles so that the fluidizing media and unreacted char can be reintroduced into the biogasifier for continued utilization. Also shown is a cut away view of the gas inlet 203 in the bubbling bed receiving an oxidant-based fluidization gas such as but not limited to e.g., air.

With reference to FIGS. 1A-B, 2 and 4A-4B, startup and operation of the biogasifer will now be described. This example is based on a feed rate of 1,168 lbs/hr of biosolids at 90% solids.

Start-Up of the Biogasifier

The inline or over-fire natural gas burner is ignited, and a slip stream of gasifier air mixed with natural gas is combusted and directed onto the top of the fluidized bed to heat up the refractory lined biogasifier reactor.

The bed begins to warm up and fluidization becomes more aggressive as the fluidizing media and fluidizing gas heat up.

The hot gas from the natural gas burner then passes into the upper section of the biogasifier and into the cyclone. This begins the warmup of the refractory in these components.

The induced draft fan is turned on and the hot gas is drawn into the oxidizer, through the heat exchangers, into the scrubbing system, and then up the stack. This continues the warmup process of the plant.

This process is continued until the biogasifier bed temperature is above 900° F. and the refractory temperature in the cyclone and oxidizer are at least 600° F.

The flue gas recycle blower is then started slowly and additional fluidizing gas is introduced into the biogasifier. This increases the fluidization regime and increases the effectiveness of the cyclone at removing particulate.

The dried sludge at 40-250 F from the dryer is now slowly added to begin heat generation within the bed of fluidizing media and the temperature is monitored closely at this point, operating within a temperature range of 1150-1600° f. This reduces the possibility of agglomerating or "clinkering" of the ash.

The biogasification reaction begins and producer gas is produced, which entrains some solids (ash and unreacted carbon) into the cyclone where particulate matter larger than 10 microns is removed by the cyclone.

The freeboard or disengaging zone allows the largest sized particles to decelerate and fall back to the bed of the biogasifier.

The solids separated by the cyclone are emptied from the base of the cyclone into a specially designed separator where the fine ash (and some carbon) is taken out as waste and the remainder is recycled back to the biogasifier. This increases the overall conversion of fuel to close to 100%.

As the temperature increases and approaches the target operating temperature, preferably in the range of 1150-1600° F., the gasification and pyrolysis reactions are at the desired levels.

Operation of the Biogasifier

The oxygen starved environment in the biogasification process may be achieved by controlling the level of oxidant air and gas entering into the reactor. Oxidant air, or ambient air, consists of approximately 23.2% oxygen by weight. Oxidant gas, or recycled flue gas, consists of oxygen levels that may vary from 5% to 15% by weight.

The temperature within the biogasifier may be controlled by adjusting the amount of oxidant air and gas entering into the reactor.

The ratio of oxygen entering the biogasifier supplied by oxidant air and gas in relation to the stoichiometric oxygen required for complete combustion of the biosolids fuel is referred to as the equivalence ratio and may be used as a means of regulating temperature within the biogasification unit. Gasification occurs by operating a thermochemical conversion process with an oxygen-to-fuel equivalence ratio between 0.1 and 0.5 relative to complete stoichiometric combustion.

Depending on the selected biosolids fuel feed rate the blend of Oxidant air to Oxidant gas will vary in order to sustain a total mass level within the biogasifier required to operate the cyclone within an acceptable range of efficiency while meeting the targeted equivalence ratio selected in order to control the process temperature.

Bed pressure within the biogasifier reaction zone may be monitored as a means of controlling the pressure of the biogasifier oxidant air & gas entering the biogasification unit and thereby ensuring continuous fluidization of the reactor bed media.

In the biogasifier 200, the oxygen is used to control the temperature, extend of reaction and overall generation of the producer gas, and these typical reactions are known to those of ordinary skill in the art. Typically these reactions are as follows:

$$C + O_2 \rightarrow CO_2 \text{ Exothermic}$$

$$2H + 0.5O_2 \rightarrow H_2O \text{ Exothermic}$$

The heat generated heats up the incoming biosolids feed, biogasifier air and recycled flue gas streams to the reaction temperature.

It also provides the heat to complete the mostly endothermic biogasification reactions that take place in the biogasifier, namely:

$$C + H_2O \rightarrow CO + H_2 \text{ Endothermic}$$

$$CO_2 + C \rightarrow 2CO \text{ Endothermic}$$

$$H_2O + CO \rightarrow H_2 + CO_2 \text{ Exothermic}$$

$$C + 2H_2 \rightarrow CH_4 \text{ Exothermic}$$

If excessive oxygen is introduced, the quality of the producer gas will be reduced. Maintaining a uniform operating temperature across the fluidized bed of the biogasifier is key to operational success.

Based on the biogasifier air and flue gas streams, and fuel properties plus conversion extent, the superficial velocity of the gas in the bed and freeboard section of the biogasifier can be calculated. This determines what size particles of fluidizing media (e.g., sand), ash, and biosolids are entrained out with the producer gas. Many factors are used to calculate superficial velocity inside the reactor, including air flow rate, recycled flue gas flow rate, reactor physical geometry such as cross-sectional area and shape, sewage sludge fuel composition, fuel feed rate, and fuel conversion extent.

Using recycled flue gas, which has a lower percentage of oxygen than air, allows not only a better way to control the oxygen and hence temperature in the biogasifier, but also allows greater control of the superficial velocity of the producer gas in both the bed and freeboard section of the biogasifier.

The biosolids, even though they are 90% solids, include clustered particles that are partially reacted and can be carried out of the biogasifier prematurely. The usual once through fuel conversion is about 85%, so 15% unreacted carbon may be carried into the cyclone.

The particle density of the inert ash is about 2160 kg/m3, the fluidizing media is around 2600 kg/m3, and the sludge particles around 600 kg/m3.

By choosing a superficial gas velocity of 1.1 m/s in the freeboard section, for example, it is possible to entrain out ash particles of 200 microns and fluidizing media particles of 100 microns in the fluidized bed. The target particle size range of the fluidizing media is within the range of 400-900 microns, so that none is lost to the cyclone separator 207.

About 50% of the ash has particles that are less than 200 microns and will be carried over to the cyclone separator 207, with about 50% being left in the bed.

Some unreacted carbon is carried into the cyclone separator 207 with particle sizes ranging from 10 to 300 microns. When the solids are removed from the bottom of the cyclone, the ash and unreacted carbon can be separated and much of the unreacted carbon recycled back into the biogasifier, thus increasing the overall fuel conversion to at least 95%. Ash accumulation in the bed of fluidizing media may be alleviated through adjusting the superficial velocity of the gases rising inside the reactor. Alternatively, bed media and ash could be slowly drained out of the gasifier base and screened over an ash grate 211 before being reintroduced back into the biogasifier. This process can be used to remove small agglomerated particles should they form in the bed of fluidizing media and can also be used to control the ash-to-media ratio within the fluidized bed.

Operation of the Thermal Oxidizer

When the dried biosolids feed to the biogasifier is started, the oxidizer air is turned on and passed into the heat exchanger 19 (FIG. 1) where it is slowly preheated before being added to the oxidizer 12. The oxidizer may be fitted with an ignition source and when the producer gas reaches the reaction chamber, the oxidation commences, and significant combustion heat is produced.

During normal operation, the temperature of the flue gas leaving the oxidizer is, for example between 1800 and 2200 F. The sensible heat from this stream is transferred via the pre-dryer and dryer heat exchangers and the flue gas temperature is reduced from 1800 F to about 550 F.

When required, the heat exchanger 17 is used to pre-heat the biogasifier gas stream prior to injection into the biogasifier.

The flue gas is now about 500 F and between 20 and 30% of the flue gas is recycled back to the biogasifier using the flue gas recycle blower. The remainder passes into heat exchanger 3 where the oxidized air may be pre-heated to at least 300 F. When the oxidizer air is pre-heated to 300 F and over, less energy from combustion of producer gas may be used to heat the air up to the temperature that the thermal oxidizer operates at, thus increasing the performance of the oxidizer.

Using the oxygen level defined at the oxidizer inlet, the oxygen level in the flue gas can be adjusted by increasing/decreasing the amount of air being fed to the oxidizer. Oxygen levels can be controlled by limiting the use of external or ambient air and increasing an amount of recirculated flue gas in order to maintain a required temperature profile at the exit of the oxidizer.

This has the effect of increasing/decreasing the excess air being fed to the oxidizer but is never below the minimum level of excess air required (>25%), to ensure complete combustion and low emissions.

Biogasifier Reactor Sizing

The following provides a non-limiting example illustrating computation of the best dimensions for a bubbling fluidized bed biogasification reactor in accordance with an embodiment of the invention. The biogasifier, in this example, is sized to accommodate two specific operating conditions: The current maximum dried biosolids output generated from the dryer with respect to the average solids content of the dewatered sludge supplied to the dryer from the existing dewatering unit; and the future maximum dried biosolids feed rate that the dryer will have to deliver to the biogasifier if the overall biosolids processing system has to operate without consumption of external energy, e.g., natural gas, during steady state operation with 25% solids content dewatered sludge being dried and 5400 lb/hr of water being evaporated from the sludge.

The first operating condition corresponds to the maximum output of dried sewage sludge from the dryer if, e.g., 16% solids content sludge is entering the dryer, and 5400 lb/hr of water is evaporating off the sludge. This corresponds to a biosolids feed rate in the small-scale gasifier of 1,168 lb s/hr of thermally dried biosolids at 10% moisture content entering the gasifier. The second operating condition corresponds to the maximum amount of dried biosolids (dried to 10% moisture content) that the drier can produce if 25% solids content dewatered biosolids is fed into the drier. A solids content of 25% represents the estimated extent of dewatering that is required to make the drying load equal to the amount of thermal energy which can be recovered from the flue gas and used to operate the dryer. If biosolids below 25% solids content are processed in the dryer, an external heat source can be expected to be required to supplement the drying process. The second condition corresponds to the gasifier needing to process 2,000 lb/hr of 10% moisture content biosolids.

Figure 5:
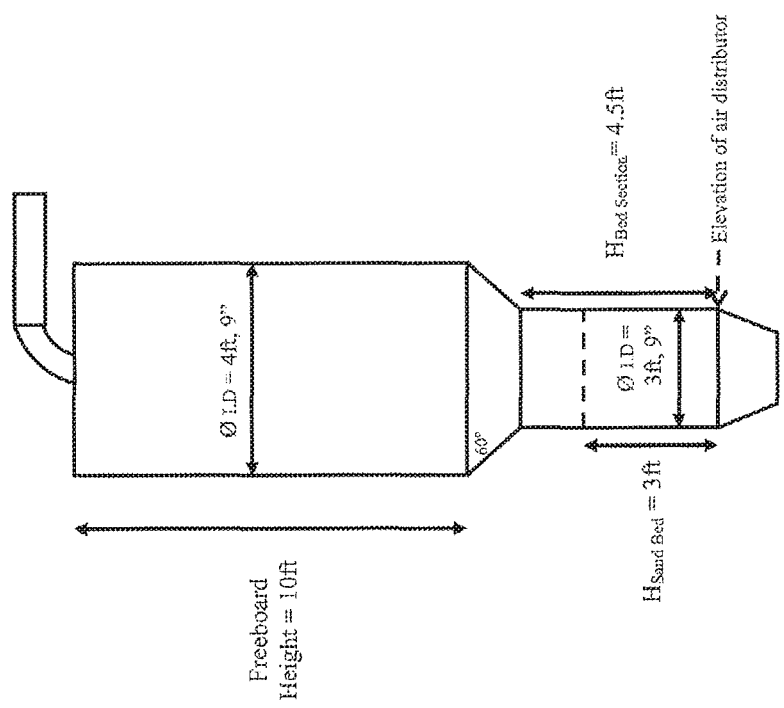
FIG. 5 shows a schematic side view illustrating a non-limiting example of biogasifier internal dimensions in accordance with the invention in an embodiment.

FIG. 5 shows a non-limiting example of the biogasifier internal dimensions in accordance with the invention in an embodiment. The dimensions shown satisfy the operational conditions that are outlined below. Tables 1-3 below show a non-limiting example of physical parameters taken into consideration when setting the biogasifier dimensions. Tables 1 and 2 show fuel composition results in accordance with an ultimate analysis and a proximate analysis, respectively. Table 3 shows the biogasifier, in this example, is sized to accommodate specific design operating conditions for dried biosolids feed rate delivered to the biogasifier corresponding to a biosolids feed rate in the small scale gasifier of 1,168 lb/hr and 2,000 lb/hr of thermally dried biosolids at 10% moisture content entering the gasifier. The dimensions shown satisfy the operational conditions that are outlined below.

TABLE 1

| Element | wt %$_{dry\ basis}$ |
|---|---|
| C: | 41.9 |
| H: | 5.5 |
| O: | 21.6 |
| N: | 6.5 |
| S: | 1.0 |
| Ash (assume 100% Si): | 23.5 |
| | 100 |

TABLE 2

| | wt %$_{dry\ basis}$ |
|---|---|
| Volatile matter: | 65.4 |
| Fixed carbon: | 11.1 |
| Ash | 23.5 |

TABLE 3

| Parameter: | Case 1: Low Biosolids Feed Rate of 1168 lb/hr | Case 2: High Biosolids Feed Rate of 2000 lb/hr |
|---|---|---|
| Average temperature in gasifier (media bed & freeboard) | 1450° F. or 788° C. | 1450° F. or 788° C. |
| Moisture content of the biosolids into the gasifier | 10% | 10% |
| Calorific value of the biosolids (HHV dry basis) | 7600 Btu/lb | 7600 Btu/lb |
| Estimated average fuel particle size | 300 μm | 300 μm |
| Estimated average ash particle size | 200 μm | 200 μm |
| Target equivalence ratio | 0.3 | 0.3 |
| Amount of gasification air required | 1825 lb/hr | 3125 lb/hr |

TABLE 3-continued

| Parameter: | Case 1: Low Biosolids Feed Rate of 1168 lb/hr | Case 2: High Biosolids Feed Rate of 2000 lb/hr |
|---|---|---|
| Volume flow rate of gasification air (at S.T.P) | 0.17 m$^3$/s | 0.29 m$^3$/s |
| Assumed volatile matter conversion to producer gas | 100% | 100% |
| Assumed fixed carbon conversion to producer gas | 50% | 50% |
| Producer gas mass flow rate | 0.339 kg/s or 2630 lb/hr | 0.580 kg/s or 4592 lb/hr |
| Producer gas volume flow rate (actual) | 1.02 m$^3$/s at 1450° F. | 1.74 m$^3$/s at 1450° F. |
| Producer gas volume flow rate (actual) | 2352 ACFM at 1450° F. | 4029 ACFM at 1450° F. |
| Producer gas volume flow rate (S.T.P) | 0.29 m$^3$/s | 0.49 m$^3$/s |
| Producer gas volume flow rate (S.T.P) | 661 SCFM | 1133 SCFM |
| Estimated fuel particle density | 600 kg/m$^3$ | 600 kg/m$^3$ |
| Estimated ash particle density | 2160 kg/m$^3$ | 2160 kg/m$^3$ |
| Estimated media (sand) particle density | 2600 kg/m$^3$ | 2600 kg/m$^3$ |
| Selected Ø I.D of bed section | 3.75 ft or 3ft, 9" | 3.75 ft or 3ft, 9" |
| Media bed depth (unfluidized) | 3 ft | 3 ft |
| Height of reactor bed-section | 4.5 ft | 4.5 ft |
| Superficial velocity of gas above media bed surface | 0.99 m/s | 1.70 m/s |
| Superficial velocity from gasification air at S.T.P | 0.16 m/s | 0.28 m/s |
| Minimum fluidization velocity, $U_{mf}$ based on air at S.T.P | 0.16 m/s | 0.16 m/s |
| Average media (sand) particle size in the bed | ~700 μm | ~700 μm |
| Pressure drop across incipiently fluidized bed (gas distributor to bed surface). | 1.7 psi | 1.7 psi |
| Selected Ø ID of freeboard section | 4.75 ft or 4ft, 9" | 4.75 ft or 4ft, 9" |
| Superficial velocity of gas in freeboard | 0.62 m/s | 1.06 m/s |
| T.D.H for particles | ~11.9 ft | ~21.8 ft |
| Maximum size of fuel particle which will get entrained | 195 μm | 390 μm |
| Maximum size of ash particle which will get entrained | 100 μm | 200 μm |
| Maximum size of media particle which will get entrained | 85 μm | 180 μm |
| Energy input to gasifier (HHV basis) | 2.34 MW$_{th}$ | 4.00 MW$_{th}$ |
| Equivalent grate energy release rate | 2.28 MW$_{th}$/m$^2$ | 3.90 MW$_{th}$/m$^2$ |
| Equivalent grate energy release rate (~1 million Btu per ft$^2$ of bed area) | 722,596 Btu$_{th}$/ft$^2$ | 1,237,322 Btu$_{th}$/ft$^2$ |
| Reactor diameter to fuel feed rate ratio (~1 ft diameter for every 500 lb/hr fuel) | 1.61 ft/ [500 lb/hr fuel] | 0.94 ft/ [500 lb/hr fuel] |

With continued reference to FIG. 5, one factor in determining biogasifier sizing is the bed section internal diameter. The role of the bed section of the reactor is to contain the fluidized media bed. The driving factor for selecting the internal diameter of the bed section of the gasifier is the superficial velocity range of gases, which varies with different reactor internal diameters. The internal diameter has to be small enough to ensure that the media bed is able to be fluidized adequately for the given air, recirculated flue gas and fuel feed rates at different operating temperatures, but not so small as to create such high velocities that a slugging regime occurs and media is projected up the freeboard section. The media particle size can be adjusted during commissioning to fine tune the fluidizing behavior of the bed. In the present, non-limiting example, an average media (sand) particle size of about 700 μm was selected due to its ability to be fluidized readily, but also its difficulty to entrain out of the reactor. The most difficult time to fluidize the bed is on start up when the bed media and incoming gases are cold. This minimum flow rate requirement is represented by the minimum fluidization velocity, ("$U_{mf}$") values displayed in the previous table.

Another factor in determining biogasifier sizing is the freeboard section internal diameter. The freeboard region of the biogasifier allows for particles to drop out under the force of gravity. The diameter of the freeboard is selected with respect to the superficial velocity of the gas mixture that is created from different operating temperatures and fuel feed rates. The gas superficial velocity must be great enough to entrain the small ash particles, but not so great that the media particles are entrained in the gas stream. The extent of fresh fuel entrainment should also be minimized from correct freeboard section sizing. This is a phenomenon to carefully consider in the case of biosolids gasification where the fuel typically has a very fine particle size. Introducing the fuel into the side of the fluidized bed below the fluidizing media's surface is one method to minimize fresh fuel entrainment. This is based on the principle that the fuel has to migrate up to the bed's surface before it can be entrained out of the biogasifier, and this provides time for the gasification reactions to occur. In the present non-limiting example shown in FIG. 5, a reactor freeboard diameter of 4 feet, 9 inches is chosen in an effort to maintain gas superficial velocities high enough to entrain out ash but prevent entrainment of sand (or other fluidizing media) particles in the bed.

A further factor in determining biogasifier sizing is the media bed depth and bed section height. In general, the higher the ratio of media to fuel in the bed, the more isothermic the bed temperatures are likely to be. Typically, fluidized beds have a fuel-to-media mass ratio of about 1-3%. The amount of electrical energy consumed to fluidize the media bed typically imparts a practical limit on the desirable depth of the media. Deeper beds have a higher gas pressure drop across them and more energy is consumed by the blower to overcome this resistance to gas flow. A fluidizing media depth of 3 feet is chosen in this example shown in FIG. 5, which is based on balancing the blower energy consumption against having enough media in the bed to maintain isothermal temperature and good heat transfer rates. The height of the bed section of the reactor in this non-limiting example is based on a common length-to-diameter aspect ratio of 1.5, relative to the depth of the fluidizing media.

Another factor in determining biogasifier sizing is the height of the freeboard section 205. The freeboard section 205 is designed to drop out particles under the force of gravity. As one moves up in elevation from the bed's surface, the particle density decreases, until at a certain elevation, a level known as the Transport Disengaging Height (TDH) is reached. Above the TDH, the particle density entrained up the reactor is constant. Extending the reactor above the TDH adds no further benefit to particle removal. For practical purposes 10 feet is selected for the height of the freeboard section 205 in this non-limiting example shown in FIG. 5. While the invention has been particularly shown and described with reference to a preferred embodiment in FIG. 5, it will be understood by those skilled in the art that various changes in form and details may be made therein without departing from the spirit and scope of the invention.

Figure 6:
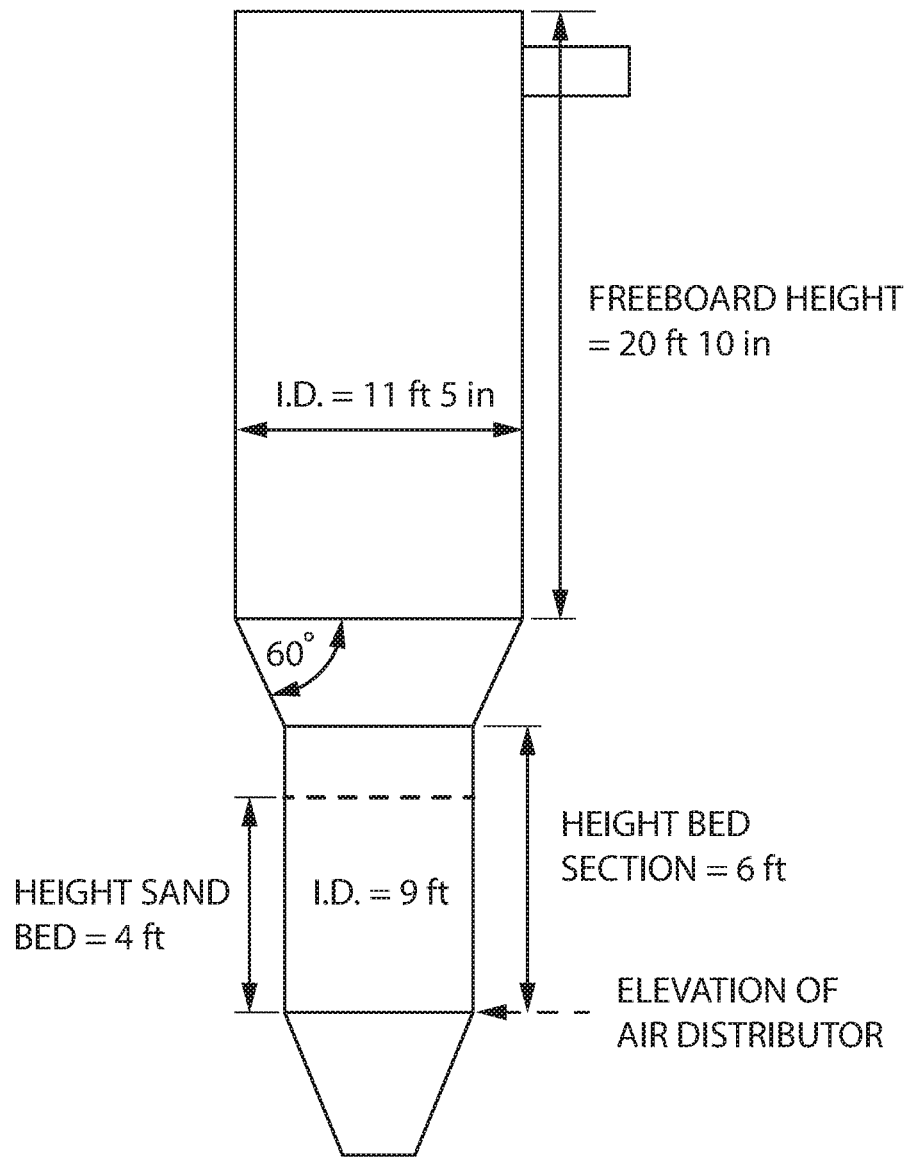
FIG. 6. shows a schematic side view illustrating a larger scaled up but also non-limiting example of biogasifier internal dimensions in accordance with the invention in an embodiment.

FIG. 6 shows a schematic side view illustrating a larger scaled-up embodiment is provided in which the biogasifier internal dimensions are enlarged in accordance with the invention. In this embodiment, the invention illustrates a scaling up or enlargement of the biogasifier reactor vessel. In one embodiment, the increase in reactor vessel size has a capacity scale that is at least 4 times larger in processing feedstock volume than the small-scale reactor vessel shown in FIG. 5 and referenced in FIGS. 1-5. For example, the small-scale reactor can process 24 tons per day of feedstock. The large-scale reactor can process more than 40 tons per day with an average of about 100 tons per day of feedstock. At an average of 100 tons per day of feedstock equals an average of at least 4 times that of the small-scale reactor of 24 tons per day which is equal to about 96 tons per day. In one, embodiment of the scaled-up large format reactor, the multi-tuyere gas distributor shown in FIG. 3 is replaced with a conventional pipe-based fluidization gas distribution system shown in FIGS. 8A-8C. The substitution of the pipe-based distributor 800 simplifies and eliminates the complexity, time and cost associated with the mechanical fabrication of scaling up the multi-tuyere gas distributor design used in the bioreactor unit illustrated in FIG. 3 and referenced in FIGS. 1-5. A conventional pipe-based fluidization gas distribution system allows a single large vessel reactor capable of processing at least 4 times the quantity of feedstock processed in a small-scale reactor illustrated in FIGS. 1-5. The larger scale reactor illustrated in FIGS. 6-8 has many of the same features as the smaller scaled version illustrated in FIGS. 1-5. However, some adjustments to the reactor bed and free-board height are required based on the change in diameter of the reactor bed section. The formula for Transport Disengaging Height ("TDH") is a function of the change in diameter of the reactor bed section 704 show in FIG. 7. Specifically, the geometric ratios remain the same to minimize/eliminate performance scale-up risk.

FIG. 6 also shows a non-limiting example illustrating computation of the sample dimensions for sizing the biogasifier reactor when it is a bubbling fluidized bed biogasification reactor. The biogasifier, in this example, is sized to accommodate specific design operating conditions for dried biosolids feed rate delivered to the biogasifier corresponding to a biosolids feed rate in the large-scale gasifier of 8,333 lb/hr and 7040 lb/hr of thermally dried biosolids at 10% moisture content entering the gasifier. The dimensions shown satisfy the operational conditions that are outlined below. Tables 4 below shows a non-limiting example of physical parameters taken into consideration when setting the biogasifier dimensions.

TABLE 4?

| Parameter: | Case 1: Low Biosolids Feed Rate of 1168 lb/hr | Case 2: High Biosolids Feed Rate of 2000 lb/hr |
|---|---|---|
| Average temperature in gasifier (media bed & freeboard) | 1450° F. or 788° C. | 1450° F. or 788° C. |
| Moisture content of the biosolids into the gasifier | 10% | 10% |
| Calorific value of the biosolids (HHV dry basis) | 7600 Btu/lb | 7600 Btu/lb |
| Estimated average fuel particle size | 300 μm | 300 μm |
| Estimated average ash particle Size | 200 μm | 200 μm |
| Target equivalence ratio | 0.3 | 0.3 |
| Amount of gasification air | 15,055 lb/hr | 12719 lb/hr |

TABLE 4?-continued

| Parameter: | Case 1: Low Biosolids Feed Rate of 1168 lb/hr | Case 2: High Biosolids Feed Rate of 2000 lb/hr |
|---|---|---|
| required | | |
| Volume flow rate of gasification air (at S.T.P) | 1.4 m$^3$/s | 1.18 m$^3$/s |
| Assumed volatile matter conversion to producer gas | 100% | 100% |
| Assumed fixed carbon conversion to producer gas | 50% | 50% |
| Producer gas mass flow rate | 2.77 kg/s or 21,472 lb/hr | 2.34 kg/s or 18140 lb/hr |
| Producer gas volume flow rate (actual) | 8.89 m$^3$/s at 1450° F. | 7.51 m$^3$/s at 1450° F. |
| Producer gas volume flow rate (actual) | 18,834 ACFM at 1450° F. | 15,912 ACFM at 1450° F. |
| Producer gas volume flow rate (S.T.P) | 2.37 m$^3$/s | 2.00 m$^3$/s |
| Producer gas volume flow rate (S.T.P) | 5,396 SCFM | 4,559 SCFM |
| Estimated fuel particle density | 600 kg/m$^3$ | 600 kg/m$^3$ |
| Estimated ash particle density | 2160 kg/m$^3$ | 2160 kg/m$^3$ |
| Estimated media (sand) particle density | 2600 kg/m$^3$ | 2600 kg/m$^3$ |
| Selected Ø I.D of bed section | 9.16 ft or 9 ft, 2" | 9.08 ft or 9 ft, 1" |
| Media bed depth (unfluidized) | 4 ft | 3 ft |
| Height of reactor bed-section | 6 ft | 4.5 ft |
| Superficial velocity of gas above media bed surface | 1.48 m/s | 1.25 m/s |
| Superficial velocity from gasification air at S.T.P | 0.24 m/s | 0.20 m/s |
| Minimum fluidization velocity, $U_{mf}$ based on air at S.T.P | 0.16 m/s | 0.16 m/s |
| Average media (sand) particle size in the bed | ~700 μm | ~700 μm |
| Pressure drop across incipiently fluidized bed (gas distributor to bed surface). | 1.7 psi | 1.7 psi |
| Selected Ø I.D of freeboard section | 11.0 ft | 11.42 ft or 11 ft, 5" |
| Superficial velocity of gas in freeboard T.D.H for particles | 1.06 m/s ~11.9 ft | 0.79 m/s ~20.7 ft |
| Maximum size of fuel particle which will get entrained | 390 μm | 390 μm |
| Maximum size of ash particle which will get entrained | 200 μm | 200 μm |
| Maximum size of media particle which will get entrained | 85 μm | 180 μm |
| Energy input to gasifier (HHV basis) | 18.5 MW$_{th}$ | 15.67 MW$_{th}$ |
| Equivalent grate energy release rate | 3.08 MW$_{th}$/m$^2$ | 2.61 MW$_{th}$/m$^2$ |
| Equivalent grate energy release rate (~1 million Btu per ft$^2$ of bed area) | 978,539 Btu$_{th}$/ft$^2$ | 826,694 Btu$_{th}$/ft$^2$ |
| Reactor diameter to fuel feed rate ratio (~1 ft diameter for every 500 lb/hr fuel) | 0.54 ft/ [500 lb/hr fuel] | 0.64 ft/ [500 lb/hr fuel] |

Figure 7:
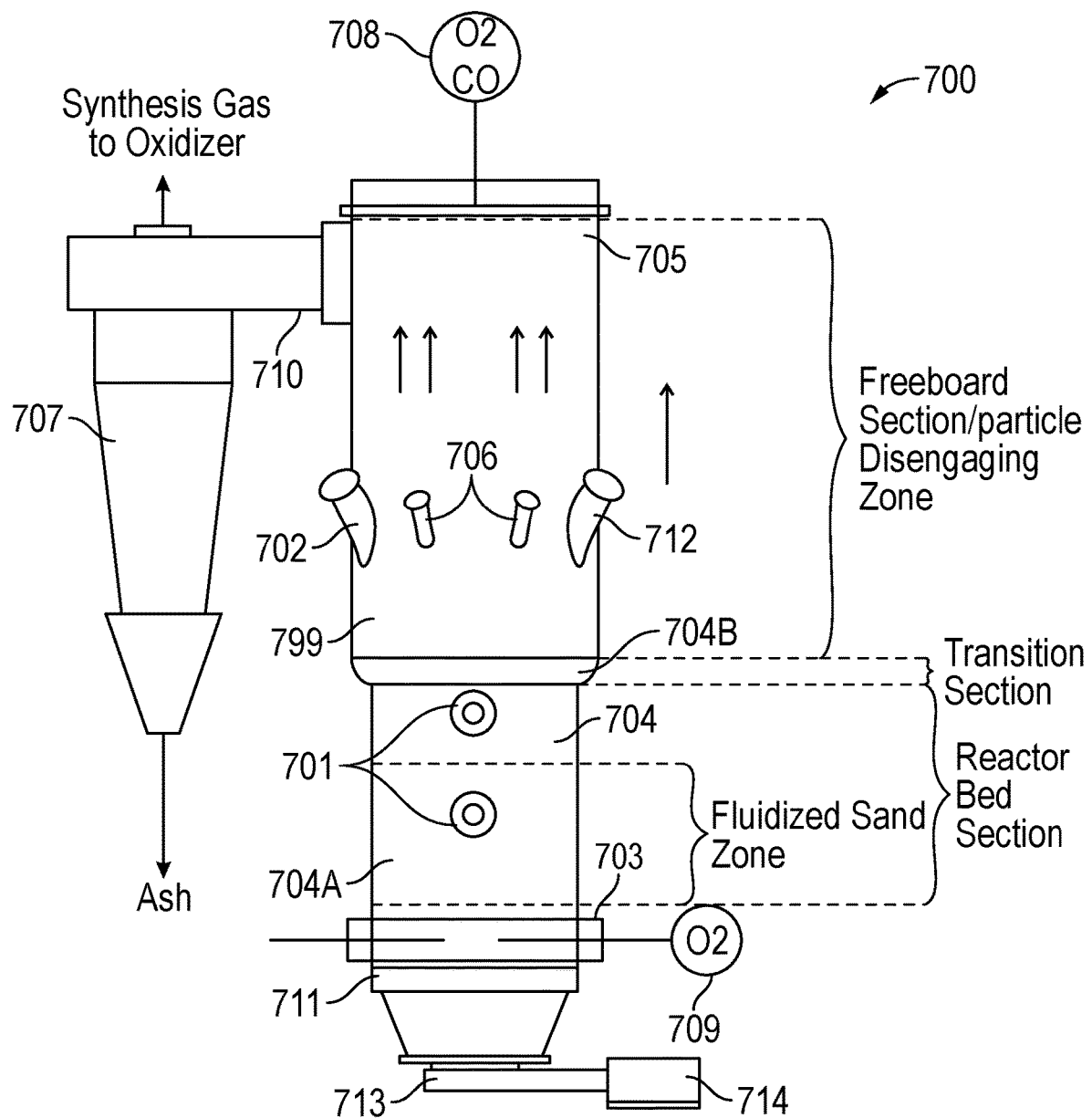
FIG. 7 shows a schematic side view illustrating the larger scaled up fluidized bed biogasifier in accordance with an embodiment of the invention.

FIG. 7 shows a scaled-up embodiment of a bubbling type fluidized bed gasifier 700. In one embodiment, the bubbling fluidized bed gasifier 700 will include a reactor 799 operably connected to the feeder system (not shown) as an extended part of the standard gasifier system 700. A fluidized media bed 704A such as but not limited to quartz sand is in the base of the reactor vessel called the reactor bed section 704. In one embodiment the fluidized sand is a zone that has a temperature of 1150° F.-1600° F. Located above the reactor bed section 704 is a transition section 704B and above the transition section 704B is the freeboard section 705 of the reactor vessel 799. Fluidizing gas consisting of air, flue gas, pure oxygen or steam, or a combination thereof, is introduced into the fluidized bed reactor 799 to create a velocity range inside the freeboard section 705 of the gasifier 700 that is in the range of 0.1 m/s (0.33 ft/s) to 3 m/s (9.84 ft/s). The biosolids are heated inside the fluidized bed reactor to a temperature range between 900° F. and 1600° F. in an oxygen-starved environment having sub-stoichiometric levels of oxygen, e.g., typically oxygen levels of less than 45% of stoichiometric. In another embodiment, the fluidized sand is a zone that has a temperature of 1150° F.-1600° F.

The reactor fluidized bed section 704 of a fluidized bubbling bed gasifier 700 is filled with a fluidizing media 704A that may be a sand (e.g., quartz or olivine), or any other suitable fluidizing media known in the industry. Feedstock such, as but not limited to sludge, is supplied to the reactor bed section 704 through fuel feed inlets 701 at 40-250° F. In one embodiment the feedstock is supplied to the reactor bed section 704 through fuel feed inlets 701 at 215° F.; with the gas inlet 703 in the bubbling bed receiving an oxidant-based fluidization gas such as but not limited to e.g., gas, flue gas, recycled flue gas, air, enriched air and any combination thereof (hereafter referred to generically as "gas" or "air"). In one embodiment the air is at about 600° F. The type and temperature of the air is determined by the gasification fluidization and temperature control requirements for a particular feedstock. The fluidization gas is fed to the bubbling bed via a gas distributor, such as shown in FIGS. 3 and 8A-C. An oxygen-monitor 709 may be provided in communication with the fluidization gas inlet 703 to monitor oxygen concentration in connection with controlling oxygen levels in the gasification process. An inclined or over-fire natural gas burner (not visible) located on the side of the reactor vessel 799 receives a natural gas and air mixture via a port 702. In one embodiment, the natural gas air mixture is 77° F. which can be sued to start up the gasifier and heat the fluidized bed media 704A. When the minimum ignition temperature for self-sustaining of the gasification reactions is reached (~900° F.), the natural gas is shut off. View ports 706 and a media fill port 712 are also provided.

In one embodiment, a freeboard section 705 is provided between the fluidized bed section 704 and the producer gas outlet 710 of the gasifier reactor vessel 799. As the biosolids thermally decompose and transform in the fluidized bed media section (or sand zone) into producer gas and then rise through the reactor vessel 799, the fluidizing medium 704A in the fluidized bed section 704 is disentrained from the producer gas in the freeboard section 705 which is also known as and called a particle disengaging zone. A cyclone separator 707 may be provided to separate material exhausted from the fluidized bed reactor 799 resulting in clean producer gas for recovery with ash exiting the bottom of the cyclone separator 707 alternatively for use or disposal.

An ash grate 711 may be fitted below the gasifier vessel for bottom ash removal. The ash grate 711 may be used as a sifting device to remove any large inert, agglomerated or heavy particles so that the fluidizing media and unreacted char can be reintroduced into the gasifier for continued utilization. In one embodiment, a valve such as but not limited to slide valve 713 which is operated by a mechanism to open the slide valve 714 is located beneath the ash grate 711 to collect the ash. In one embodiment, a second valve 713 and operating mechanism 714 (no shown) are also located below the cyclone separator 207 for the same purpose. That is as a sifting device to remove any large inert, agglomerated or heavy particles so that the fluidizing media and unreacted char can be reintroduced into the gasifier for continued utilization. In one embodiment the ash grate 711 may be a generic solids removal device known to those of ordinary skill in the art. In another embodiment, the ash grate 711 may be replaced by or combined with the use of an overflow nozzle.

A producer gas control 708 monitors oxygen and carbon monoxide levels in the producer gas and controls the process accordingly. In one embodiment a gasifier feed system (not shown) feeds the gasifier reactor 799 through the fluidized fuel inlets 701. In one embodiment, the gasifier unit 700 is of the bubbling fluidized bed type with a custom fluidizing gas delivery system and multiple instrument control. The gasifier reactor 799 provides the ability to continuously operate, discharge ash and recycle flue gas for optimum operation. The gasifier reactor 799 can be designed to provide optimum control of feed rate, temperature, reaction rate and conversion of varying feedstock into producer gas.

A number of thermocouple probes (not shown) are placed in the gasifier reactor 799 to monitor the temperature profile throughout the gasifier. Some of the thermal probes are placed in the fluidized bed section 704 of the gasifier rector 799, while others are placed in the freeboard section 705 of the gasifier. The thermal probes placed in the fluidized bed section 704 are used not only to monitor the bed temperature but are also control points that are coupled to the gasifier air system via port 702 in order to maintain a certain temperature profile in the bed of fluidizing media. There are also a number of additional control instruments and sensors that may be placed in the gasifier system 700 to monitor the pressure differential across the bed section 704 and the operating pressure of the gasifier in the freeboard section 205. These additional instruments are used to monitor the conditions within the gasifier as well to as control other ancillary equipment and processes to maintain the desired operating conditions within the gasifier. Examples of such ancillary equipment and processes include but are not limited to the cyclone, thermal oxidizer and recirculating flue gas system and air delivery systems. These control instruments and sensors are well known in the industry and therefore not illustrated.

With reference to FIG. 7, an optional ash grate 711 may be fitted below the gasifier vessel for bottom ash removal. The ash grate 711 may be used as a sifting device to remove any agglomerated particles so that the fluidizing media and unreacted char can be reintroduced into the gasifier for continued utilization. In one embodiment, a slide valve 713 operated by a mechanism to open the slide valve 714 is located beneath the ash grate 711 to collect the ash. In one embodiment, a second slide valve 713 and operating mechanism 714 are located below the cyclone separator 707.

As with the small format fluidized bed gasifier, some unreacted carbon is carried into the cyclone separator 707 with particle sizes ranging from 10 to 300 microns. When the solids are removed from the bottom of the cyclone, the ash and unreacted carbon can be separated and much of the unreacted carbon recycled back into the biogasifier, thus increasing the overall fuel conversion to at least 95%. Ash accumulation in the bed of fluidizing media may be alleviated through adjusting the superficial velocity of the gases rising inside the reactor. Alternatively, bed media and ash could be slowly drained out of the gasifier base and screened over an ash grate 711 before being reintroduced back into the biogasifier. This process can be used to remove small agglomerated particles should they form in the bed of fluidizing media and can also be used to control the ash-to-media ratio within the fluidized bed.

With continued reference to FIG. 7, a feedstock such as but not limited to biosolid material can be fed into the gasifier by way of the fuel feed inlets 701 from more than one location on the reactor vessel 799 and wherein said fuel feed inlets 701 may be variably sized such that the desired volumes of feedstock are fed into the gasifier through multiple feed inlets 701 around the reactor vessel 799 to accommodate a continuous feed process to the gasifier. For the present invention and in one embodiment, the number of fuel feed inlets is between 2-4. The minimum number of feed inlets 701 is based, in part, on the extent of extent of back mixing and radial mixing of the char particles in the bed and on the inside diameter of the reactor bed section 704. For bubbling fluidized beds, one feed point could be provided per 20 ft2 of bed cross sectional area. For example, and in one embodiment, if the reaction bed section has an internal diameter of 9 ft, the reactor vessel 799 will have at least 3 feed inlets 701 (located equidistant radially to maintain in-bed mixing. Feed inlets 701 may be considered all on one level, or on more than one level or different levels and different sizes.

With continued reference to FIGS. 6 and 7, one factor in determining biogasifier sizing is the bed section internal diameter of the reactor bed section 704. The role of the bed section 704 of the reactor is to contain the fluidized media bed. The driving factor for selecting the internal diameter of the bed section 704 of the gasifier is the superficial velocity range of gases, which varies with different reactor internal diameters. The internal diameter has to be small enough to ensure that the media bed is able to be fluidized adequately for the given air, recirculated flue gas and fuel feed rates at different operating temperatures, but not so small as to create such high velocities that a slugging regime occurs and media is projected up the freeboard section. The media particle size can be adjusted during commissioning to fine tune the fluidizing behavior of the bed. In the present, non-limiting example, an average media (sand) particle size of 700 μm was selected due to its ability to be fluidized readily, but also its difficulty to entrain out of the reactor. The most difficult time to fluidize the bed is on start up when the bed media and incoming gases are cold. This minimum flow rate requirement is represented by the minimum fluidization velocity (Umf) values displayed in the previous table.

Another factor in determining biogasifier sizing is the freeboard section 705 internal diameter. The freeboard region 705 of the biogasifier allows for particles to drop out under the force of gravity. The diameter of the freeboard is selected with respect to the superficial velocity of the gas mixture that is created from different operating temperatures and fuel feed rates. The gas superficial velocity must be great enough to entrain the small ash particles, but not so great that the media particles are entrained in the gas stream. The extent of fresh fuel entrainment should also be minimized from correct freeboard section sizing. This is a phenomenon to carefully consider in the case of biosolids gasification where the fuel typically has a very fine particle size. Introducing the fuel into the side of the fluidized bed below the fluidizing media's surface is one method to minimize fresh fuel entrainment. This is based on the principle that the fuel has to migrate up to the bed's surface before it can be entrained out of the biogasifier, and this provides time for the gasification reactions to occur. In one embodiment, a reactor freeboard 705 diameter of 11 feet, 5 inches is chosen in an effort to maintain gas superficial velocities high enough to entrain out ash but prevent entrainment of sand (or other fluidizing media) particles in the bed.

Another factor in determining biogasifier sizing is the height of the freeboard section 705. The freeboard section 705 is designed to drop out particles under the force of gravity. As particles move up in elevation from the bed section 704, the particle density decreases, until at a certain elevation, a level known as the Transport Disengaging Height ("TDH") is reached. Above the TDH, the particle density entrained within and moving up the reactor vessel 799 is constant. Extending the reactor vessel above the TDH adds no further benefit to particle removal. In one embodiment the freeboard height is over 20 ft. In another embodiment the height above the TDH is 10 ft. In another embodiment, the freeboard 705 height is between 10 and 20 feet.

With continued reference to FIGS. 6 and 7, an additional factor in determining biogasifier sizing is the media bed depth and bed section height with a sample illustration in FIG. 6. In general, the higher the ratio of media to fuel in the bed, the more isothermic the bed temperatures are likely to be. Typically, fluidized beds have a fuel-to-media mass ratio of about 1-3%. The amount of electrical energy consumed to fluidize the media bed typically imparts a practical limit on the desirable depth of the media. Deeper beds have a higher gas pressure drop across them and more energy is consumed by the blower to overcome this resistance to gas flow. A unfluidized media depth of 3 ft is chosen in this example based on balancing the blower energy consumption against having enough media in the bed to maintain isothermal temperature and good heat transfer rates. In one embodiment, is based on a common length-to-diameter aspect ratio of 1.5, relative to the depth of the fluidizing media. In one embodiment of the current invention the media depth is 4 feet of same and the bed section height is 6 ft. While the invention has been particularly shown and described with reference to a preferred embodiment thereof, it will be understood by those skilled in the art that various changes in form and details may be made therein without departing from the spirit and scope of the invention.

Figure 8A:
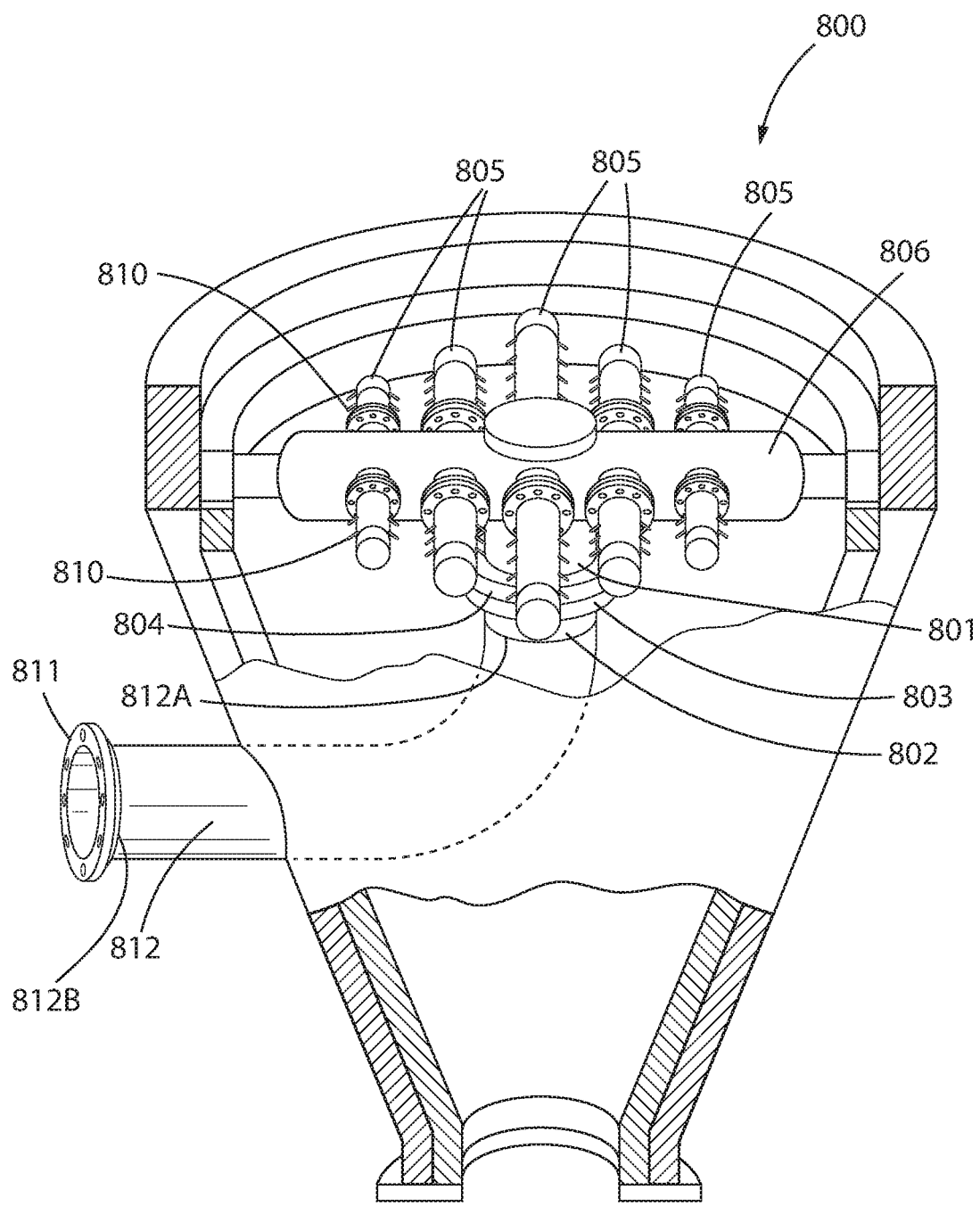
FIG. 8A shows a cut away perspective view illustrating a pipe gas distributor of the biogasifier in accordance with an embodiment of the invention.
Figure 8B:
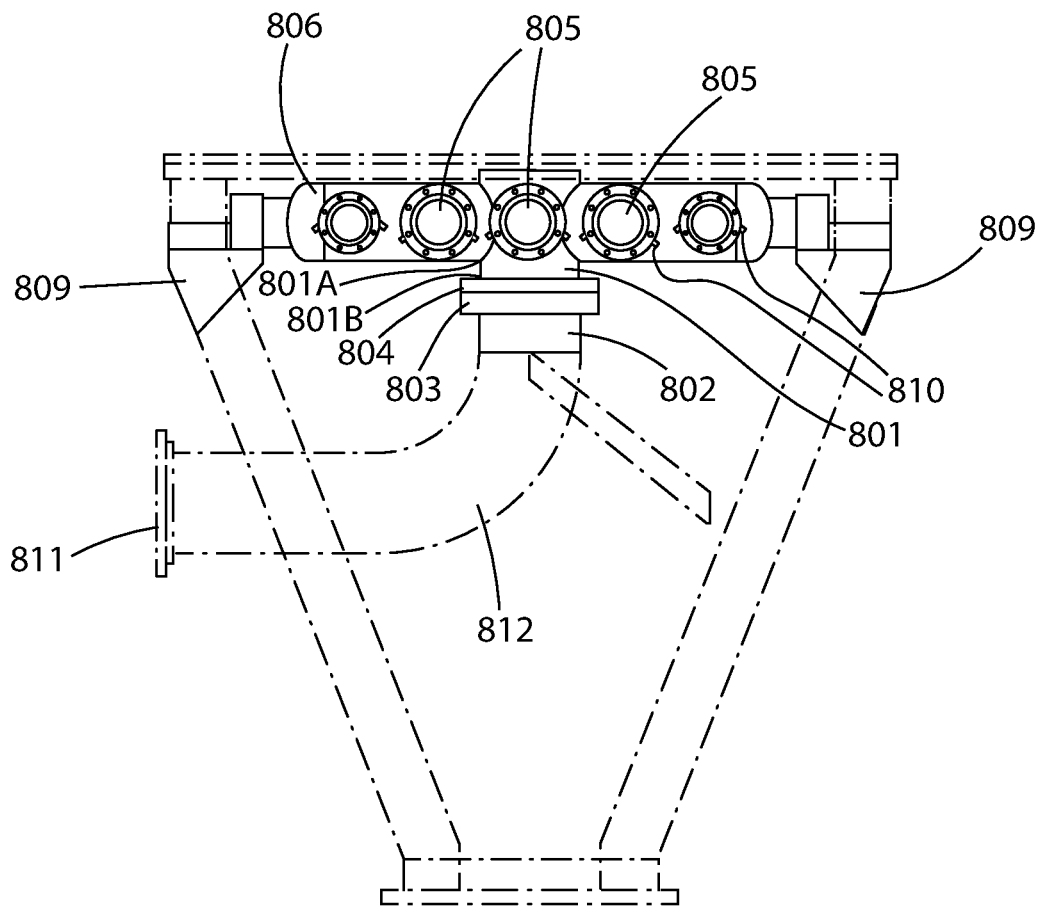
FIG. 8B shows a side elevational view illustrating a pipe gas distributor of the biogasifier in accordance with an embodiment of the invention.
Figure 8C:
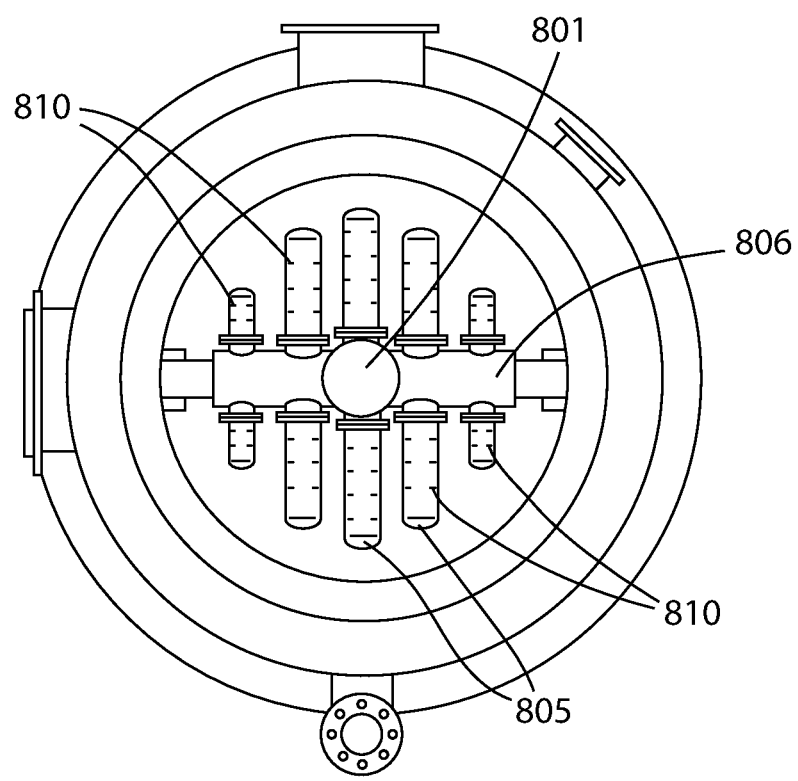
FIG. 8C shows a bottom plan view illustrating a pipe gas distributor of the biogasifier in accordance with an embodiment of the invention.

FIG. 8A shows a cut away perspective view illustrating a pipe gas distributor of the biogasifier in accordance with an embodiment of the invention. FIG. 8B shows a side elevational view illustrating a pipe gas distributor of the biogasifier in accordance with an embodiment of the invention. FIG. 8C shows a bottom plan view illustrating a pipe gas distributor of the biogasifier in accordance with an embodiment of the invention.

In one embodiment, the invention has a pipe distributor design with a main air inlet 801, said main air inlet 801 having an upper portion 801A and lower portion 801B. In one embodiment, the lower portion 801B is connected a pipe 812 such as but not limited to an elbow or j-pipe. In one embodiment, the lower portion 801B is connected to a pipe 812 using a male mounting seal that is connected to a female mounting seal 803 that is connected to a female mounting stub that is connected to the pipe 812. In one embodiment, the pipe 812 has a proximal end 812A and terminal end 812B wherein the proximal end 812A is mechanically connected to the main air inlet 801 and the terminal end 812B is connected to the gas inlet 703. In one embodiment, the pipe 812B terminal end has a flange 811 to connect to the gas inlet 703.

The upper portion of the main air inlet 801A is aligned with and an opening in a center trunk line 806, said trunk line 806 having at least 10 lateral air branches 805 that are open on one end to the center trunk line and closed on the other end. In one embodiment the lateral air branches 805 are symmetrically spaced on either side of the center trunk line 806. In one embodiment, the lateral air branches 805 are of varying length to fit symmetrically within the diameter of the bottom of the reactor bed 204. In one embodiment, each of the lateral air branches 805 comprise downward pointing gas and air distribution nozzles 810 which are also called, gas and air distribution ports 810. The air distribution nozzles 810 are pointed downward so the air entering from the main air inlet 801 is injected in a downward motion into the cone-shaped bottom of the gasifier reactor 799. In one embodiment the distribution nozzles 810 point downward at an angle such as but not limited to a 45-degree angle. The configuration and general locations of nozzles and components differ from the tuyere design for the smaller reactor vessel in that fewer gas/air distribution nozzles are required in a tuyere design to meet the fluidization requirements and good mixing requirements but still enough to enable the full volume of the fluidizing media material to fluidize when slumped in the bottom cone section of the reactor. This is also an essential part of the reactor.

Many of the parts making up the scaled-up version of this invention are the same as the small-scale gasifier and work the same. The advantages of this large format fluidized bed gasifier over prior art is that there are no successful single reactor vessel bubbling fluidized bed gasifiers that are larger than 30 tons per day "tpd" for biosolids feed. The current system can process more than 40 tpd, with an average processing volume of about 100 tpd. Other waste materials or systems capable of processing a range of feedstocks (not just biosolids) in large scale are unknown. Scaling up a reactor has not successfully been commercialized for both technical and economic reasons. Prior art fluidized bed gasifiers used specifically for biosolid feedstock are limited to about 30 tpd. Of the most common ambient pressure bubbling bed fluid bed gasifiers plants, most operate by utilizing biosolids (sewage sludge) or woody biomass as fuel in air blown, fluidized bed gasifiers.

The scale of the reactor is new, the gas distributor design is new, and the heights of the fluidized bed and freeboard are uniquely adjusted for more than 40 tpd with an average of about 100 tpd based on case studies sample of which are contained in Table 4 above. This means, of course, under specific conditions, the current system can process far in excess of 100 tpd. In one embodiment, the present invention processes between 80 tpd and 120 tpd of feedstock.

The present invention makes processing large volumes of feedstock in either a single- or multi-gasifier system and building large industrial facilities feasible and cost effective; replacing the current and commonly practiced use of multiple smaller units. The gas distributor can be of a different design, e.g., pipe, tuyere, perforated plate, valve plate designs, etc. The choice of distributor design may generally be guided by desired gasifier capacity (diameter size) and feedstock properties (ash content, ash softening point, reactivity, etc.), the vessel dimensions, position/location of feedstock feed ports and number of feed ports. Some parts may be made for specific substances. It will depend on the waste material properties to be handled, for example, a waste product high in chlorides may require the gas distributor or feed ports be fabricated in specific stainless steel or application of protective coatings. Overall the present large format device is comparably simpler, uses conventional components and easier to scale up under ambient pressure conditions and low temperature. In one sample embodiment for the gasification of biosolids the invention requires a minimum of 2-4 biosolids feed ports or inlets, spaced around the circumference of the gasifier; a pipe distributor design with downward pointing gas/air distribution ports, so the air is injected in a downward motion into the bottom cone of the gasifier; and the size, number and arrangement of the gas/air injection distribution ports is a function of fluidization bed medium properties and balancing the air per good design practice.

The invention is designed for the biomass waste processing industry—standardizes the capacity scale to a single design for more than 40 tpd and an average of 100 tpd of feedstock that can be used at a single facility and retain the economies of scale. It also cooperatively can work with other standard large-scale supporting equipment such as driers, pollution control equipment and thermal handling equipment. This allows for standardized system and equipment design and commoditization.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A gasification reactor comprising:
a reactor vessel which is cylindrical in shape having a bottom with an inverted cone section;
a freeboard section comprising the top half of the reactor vessel, said freeboard section having a diameter sized to contain the gas produced from the conversion of more than 40 tons of fuel per day;
a fluidized bed in a bed section within said reactor vessel located beneath the freeboard section, said fluidized bed having a diameter sized to process and convert more than 40 tons of fuel into gas per day;
at least two fuel feed inlets located beneath the freeboard section, said fuel inlets configured to feed a fuel into said reactor vessel at a fuel feed rate of more than 40 tons of fuel per day during steady-state operation of the gasifier; and
a gas distributor that is a pipe distributor comprising: a main air inlet, a center trunk line having lateral air branches; and an array of nozzles located on each of the lateral air branches,
wherein the pipe distributor is located within the inverted cone section of the reactor vessel and the cone section of the reactor vessel comprises: at least one gas inlet that feeds flue gas and air to the pipe distributor main air inlet and array of nozzles whereby the gas is directed into the fluidized bed section of the reactor vessel, wherein the lateral air branches are of varying length to fit symmetrically within the diameter of the bottom of the reactor bed.

2. The gasification reactor of claim 1, further wherein the lateral air branches are open on one end to receive gas from the center trunk line and closed on the other end.

3. The gasification reactor of claim 1, wherein the center trunk line has at least 10 lateral air branches.

4. The gasification reactor of claim 1, wherein the lateral air branches are symmetrically spaced about the center trunk line.

5. The gasification reactor of claim 1, wherein the freeboard section has a diameter of at least 137 inches and the fluidized bed has a diameter of at least 108 inches.

6. The gasification reactor of claim 1, further wherein the main air inlet has an upper and lower portion wherein the upper portion is aligned with an opening in the center trunk line and the lower portion of the main air inlet is connected to a pipe that is connected to the gas inlet.

7. The gasification reactor of claim 6, further wherein the pipe is connected to the gas inlet with a flange.

8. The gasification reactor of claim 1, further wherein each of the nozzles are configured to direct the gas downward into the bottom of the reactor vessel.

9. The gasification reactor of claim 8, further wherein the nozzles direct the gas downward at a 45-degree angle.

10. The reactor of claim 1, further comprising at least one inlet for addition of an inert media.

11. The reactor of claim 1, further comprising an outlet for agglomerates; and an outlet for producer gas.

12. The reactor of claim 1, wherein the freeboard section is configured to provide particle entrainment out of the reactor during operation.

13. The reactor of claim 1, further comprising an ash grate fitted below the bottom of the reactor.

14. The reactor of claim 1, wherein the freeboard section has a diameter greater than the fluidized bed such that a superficial velocity range of gas inside the freeboard section during steady state operation is between 0.1 m/s (0.33 ft/s) and 3 m/s (9.84 ft/s).

* * * * *